(12) United States Patent
Higashino et al.

(10) Patent No.: US 8,133,456 B2
(45) Date of Patent: Mar. 13, 2012

(54) MICROREACTOR AND METHOD OF LIQUID FEEDING MAKING USE OF THE SAME

(75) Inventors: Kusunoki Higashino, Osaka (JP);
 Akihisa Nakajima, Tokyo (JP);
 Yasuhiro Sando, Hyogo (JP); Youichi Aoki, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 531 days.

(21) Appl. No.: 12/092,116

(22) PCT Filed: Oct. 18, 2006

(86) PCT No.: PCT/JP2006/320709
 § 371 (c)(1),
 (2), (4) Date: Apr. 30, 2008

(87) PCT Pub. No.: WO2007/052471
 PCT Pub. Date: May 10, 2007

(65) Prior Publication Data
 US 2009/0155927 A1    Jun. 18, 2009

(30) Foreign Application Priority Data

Nov. 7, 2005 (JP) ................................. 2005-322507

(51) Int. Cl.
 *B01L 3/00* (2006.01)
 *F04B 19/00* (2006.01)
 *G01N 1/10* (2006.01)
(52) U.S. Cl. ........ 422/505; 422/500; 422/501; 422/502; 422/503; 422/504; 436/180

(58) Field of Classification Search .................... 422/58, 422/60, 102, 104
See application file for complete search history.

(56) References Cited

U.S. PATENT DOCUMENTS 7,223,363 B2 * 5/2007 McNeely et al. ............... 422/58

FOREIGN PATENT DOCUMENTS

| | | |
|---|---|---|
| JP | 2001322099 | 11/2001 |
| JP | 2002102681 | 4/2002 |
| JP | 2002221485 | 8/2002 |
| JP | 2002236131 | 8/2002 |
| JP | 2004028589 | 1/2004 |
| JP | 2004061320 | 2/2004 |
| JP | 2004108285 | 4/2004 |
| JP | 2004270537 | 9/2004 |
| JP | 2005230816 | 9/2005 |
| WO | 2005108571 | 11/2005 |

* cited by examiner

*Primary Examiner* — Sally Sakelaris
(74) *Attorney, Agent, or Firm* — Lucas & Mercanti, LLP

(57) ABSTRACT

A microreactor capable of reaction between a sample and a mixed reagent containing a mixture of multiple reagents, which microreactor avoids the interposition of air between driving solution and reagents and realizes high-precision controlling of the timing of mixing of reagents and other liquids, the mixing ratio of liquids, the pressure for liquid feeding, etc. Further, there is provided a method of liquid feeding making use of the same. Accordingly, a flow path branched at the position of an inlet from a flow path through which an opening communicating with an external pump communicates with the inlet is provided with an air evacuation flow path with its terminal open outward. Further, the flow path resistance of the air evacuation flow path for a liquid is made greater than the flow path resistance, for the liquid, of a flow channel from the reagent storage chamber to a reagent feed-out flow path.

7 Claims, 14 Drawing Sheets

MICROREACTOR AND METHOD OF LIQUID FEEDING MAKING USE OF THE SAME

This is a U.S. National Phase Application under 35 U.S.C. 371 of International Application PCT/JP2006/320709 on Oct. 18, 2006.

This Application claims the priority of Japanese Application No, 2005-322507 Nov. 7, 2005, the entire content of which is hereby incorporated by reference.

TECHNICAL FIELD

The present invention relates to a microreactor which is employed for inspection and analysis of a biological substance by using gene amplification reaction, antigen-antibody reaction or the like, inspection and analysis of other chemical substances, and chemical synthesis of a target compound by organic synthesis, and method of liquid feeding making use of the microreactor.

BACKGROUND ART

In recent years, micromachining technology and ultra microfabrication technology have made it possible to develop a one-chip system where conventional apparatuses or means (e.g., pump, valve, flow path and sensor) for sample preparation, chemical analysis and chemical synthesis are formed into a microstructure (Patent Document 1) This system is also called the μ-TAS (Micro Total Analysis System) bioreactor, lab-on-chips or biochip. The application of this system is anticipated to bring about a great success in the field of medical inspection, diagnostic field, environmental measuring field, and agricultural production field. In practice, as can be observed in genetic screening, when a complicated process, skilled manipulation and operation of instruments are required, an automated and simplified high-speed micro-analysis system can be said to bring about huge benefits of the required cost, amount of samples and time as well as no restriction of time and place of analysis.

In various forms of analysis and inspection, the chip for analysis is required to provide superb quantitative property, accuracy and economy in analysis. To achieve these objects, it is important to establish a liquid feed system characterized by a simple structure and high reliability. Thus, there has been an intense demand for a micro-fluid control elements characterized by a high degree of accuracy and reliability. The present inventors have already proposed a micro-pump system and its control method preferably used to achieve these objects (Patent Documents 2 through 4).

The aforementioned analysis chip is preferred to permit reaction between a sample and a mixed reagent prepared by mixing a plurality of reagents. However, such a so-called micro-reactor requires that various forms of mixing operation such as mixing between reagents, mixing between a reagent and sample are performed within a single chip. This requires a high degree of accuracy in the feed of reagents and others, as exemplified by exact timing for confluence with various reagents and others, and feeding of reagents and others under a predetermined pressure. Failure of high-precision feed of the reagents and others will lead to adverse effect upon reaction and result of detection.

In the meantime, as a mechanism for feeding a trace quantity of liquid in the minute flow path in the aforementioned analysis chip, a various kinds of methods such as a method based on differences in pressure of gases have been proposed. However, in the drive operation based on the principle of pressure difference based on suction and pressurization wherein a gas of predetermined pressure is used as a driving force, the stability of liquid feed tends to be disturbed by expansion and shrinkage of the gas when there are temperature differences in various regions within a flow path. Another problem is that, if there is a mechanism where a great pressure loss is caused in the middle of the flow path, there is a big change in flow rate before and after the passage of liquid through the portion where the great pressure loss is caused.

On the other hand, a liquid feed method for micro-fluid device is disclosed, where by using an oily driving solution, an aqueous solution incompatible with the oily solution is pushed downstream, whereby the liquid is fed (Patent Document 5).

However, the aforementioned problems can be caused when air bubbles are present between these liquids. For example, if the solution to be fed is put into the minute flow path of an analysis chip, and a driving solution is poured thereafter from the upstream thereof through the inlet of the chip via a pipe or the like, air bubbles are often present between these liquids.

Patent Document 1: Unexamined Japanese Patent Application Publication No. 2004-28589
Patent Document 2: Unexamined Japanese Patent Application Publication No. 2001-322099
Patent Document 3: Unexamined Japanese Patent Application Publication No 2004-108235
Patent Document 4: Unexamined Japanese Patent Application Publication No. 2004-270537
Patent Document 5: Unexamined Japanese Patent Application Publication No. 2004-61320

DISCLOSURE OF INVENTION

Object of the Invention

The present inventors have already proposed in the JP-2005-276799 a technology to solve the aforementioned problems. In the technology proposed therein, when the reagent filled in the flow path of the microreactor is pushed out downstream by the aqueous driving solution and is fed out, in the initial stage before the driving solution is brought into contact with the reagent, air presented between them is allowed to escape through an air evacuation flow path characterized by a small diameter and a hydrophobic inner surface, whereby air bubbles are discharged to the outside.

However, if the water repellency of the air evacuation flow path is not sufficient or the anticipated minute shape is not a desired shape, the leakage of the driving solution from the air evacuation flow path cannot be completely blocked by the water repellency. The driving solution may leak by liquid pressure.

An object of the present invention is to provide a microreactor for causing reaction between a sample and mixed reagent prepared by mixing a plurality of reagents, and a method for feeding liquid using the same, wherein this microreactor provides high-precision control of the timing for mixing liquids such as reagents, the mixing ratio of liquids and liquid feed pressure, without allowing air to be entrapped between a driving solution and the reagent.

Means for Solving the Object

A microreactor of the present invention is characterized in that the microreactor comprises in a plate like chip:
 a reagent storage section; the reagent storage section including:
  a storage chamber for storing a reagent therein;

an inlet through which a driving solution is injected into the storage chamber; and an outlet through which the reagent is pushed out of the storage chamber by the driving solution having been injected, a reagent feed-out flow path which communicates with the reagent storage section and through which the reagent is fed out of the reagent storage section;

an opening which communicates with the inlet of the reagent storage section through a flow path and is configured to communicate with an external pump for feeding the driving solution when the external pump is connected to the chip;

a branch flow path which is branched off, at a branch section at a position of the inlet, from the flow path connecting the opening to the inlet; and an air evacuation flow path which is provided in the branch flow path, and whose distal end is open to an outside, wherein a flow path resistance of the air evacuation flow path when a liquid flows therethrough is greater than a flow path resistance of a flow channel when the liquid flows through the flow channel, the flow channel which starts from the branch section as a starting point and includes from the branch section to the reagent feed-out flow path.

Further, in the microreactor of the present invention, a flow path resistance of the air evacuation flow path when the liquid flows therethrough is preferably 10 times or higher than a flow path resistance of the flow channel when the liquid flows therethrough, the flow channel which starts from the branch section as a starting point and includes from the reagent storage section to the reagent feed-out flow path.

In the present invention, the "reagent feed-out flow path" can be exemplified by a flow path from the outlet of the reagent storage section to the junction for confluence with other reagents, a flow path to a reaction section where a reagent is fixed in the chip, and a flow path to the heating section for activating a biochemical reaction.

In the aforementioned invention, an air evacuation flow path is provided on the upstream side from the inlet of the reagent storage section. This arrangement ensures the existing air between the liquids to be removed from the air evacuation flow path in the initial stage where an external pump is connected to the microreactor to feed the driving solution into the inlet.

The flow path resistance when a liquid flows into the air evacuation flow path is greater than the flow path resistance of the flow channel when a liquid flows through the flow channel from the aforementioned reagent storage section to the reagent feed-out flow path where the aforementioned branch section is assumed as the starting point. Accordingly, even if a leakage of driving solution from the air evacuation flow path occurs after air has been removed from this air evacuation flow path, the amount of the leakage can be lowered. Further, if the flow path resistance of the evacuation flow path when a liquid flows through the air evacuation flow path is at least 10 times greater, the aforementioned leakage can be reduced to a very small level.

Thus, even if there is a leakage of the driving solution from the air evacuation flow path, the intended liquid feed operation is not affected at all. Further, since air bubbles are removed, this structure ensures high-precision control of timing for mixing liquids such as reagents, mixing ratio of liquids and liquid feed pressure.

Although for complete elimination of the possibility of leakage of the driving solution from the air evacuation flow path, high precision in the minute shape of the air evacuation flow path is essential, leakage of the drive solution from the air evacuation flow path does not raise any problem in the present invention. Accordingly, the present invention does not require high precision in minute shape.

Further, in the aforementioned invention, a flow path resistance of the air evacuation flow path when an air flows therethrough is preferably smaller than a flow path resistance of the flow channel when the liquid flows therethrough, the flow channel which starts from the branch section as a starting point and includes from the reagent storage section to the reagent feed-out flow path.

This arrangement allows the driving solution to flow into the branch flow path without pushing out a reagent in the reagent storage section in the initial stage of the operation of feeding the driving solution into the reagent storage section, and the driving solution fills the branch flow path while removing air from the air evacuation flow path.

When the driving solution flows into the air evacuation flow path after complete evacuation of air, there is a great increase in the flow path resistance of the air evacuation flow path, and the driving solution flows into the reagent storage section so that the reagent is pushed out downstream.

As described above, the present invention capable of ensuring complete evacuation of air bubbles provides high-precision control of timing for mixing liquids such as reagents, mixing ratio of liquids and liquid feed pressure.

Further, a method for feeding liquid by using the microreactor of the present invention, the method comprising the step of;

feeding a driving solution by using the aforementioned microreactor, the microreactor having:

a water-repellent valve which is provided at the outlet of the reagent storage section; the water-repellent valve including:

a liquid-feed controlling flow passage which connects a flow path on a side of the reagent storage section to a flow path on a downstream side of the liquid controlling flow passage, and have a cross-sectional area smaller than a cross-sectional area of these flow paths, wherein the water-repellent valve prevents the reagent from passing through unless a liquid feed pressure reaches a predetermined pressure and allows the reagent to pass through when the liquid feed pressure equal to or more that the predetermined pressure is applied, and a flow rate Q of the driving solution flowing from the opening into the branch section satisfies the following relationship:

$$P/R_L \leq Q \leq P/R_A$$

wherein:

P is a pressure where a reagent passes through the water-repellent valve;

$R_A$ is a flow path resistance where an air passes through the air evacuation flow path; and $R_L$ is a flow path resistance where a liquid passes through the air evacuation flow path.

Further, in the microreactor of the present invention, the microreactor comprises:

a water-repellent valve which is provided at the outlet of the reagent storage section; the water-repellent valve including:

a liquid-feed controlling flow passage which connects a flow path on a side of the reagent storage section to a flow path on a downstream side of the liquid-feed controlling flow passage, and have a cross-sectional area smaller than a cross-sectional area of these flow paths, wherein the water-repellent valve prevents a reagent from passing through unless a liquid feed pressure reaches a predetermined pressure and allows the reagent to pass through when the liquid feed pressure equal to or higher than the predetermined pressure is applied, and it is preferable for a liquid to be able to be fed at a flow rate Q of the liquid flowing into the branch section from the opening which satisfies the following relationship:

$$P/R_L \leq Q \leq P/R_A$$

wherein:

P is a pressure where a reagent passes through the water-repellent valve;

$R_A$ is a flow path resistance where an air passes through the air evacuation flow path; and $R_L$ is a flow path resistance where a liquid passes through the air evacuation flow path.

In the abovementioned invention, in the initial stage of feeding out the driving solution into the reagent storage section, the driving solution enters the branch flow path without pushing out the reagent beyond the water-repellent valve at the outlet of the reagent storage section and fills the branch flow path while evacuating air from the air evacuation flow path, because the flow rate of the driving solution is assumed as $Q \leq P/R_A$.

The flow rate of the driving solution is assumed as $P/R_L \leq Q$. Accordingly, when the driving solution flows into the air evacuation flow path after complete evacuation of the air, it pushed the reagent out beyond the water-repellent valve.

As described above, this arrangement capable of ensuring complete evacuation of air bubbles provides high-precision control of timing for mixing liquids such as reagents, mixing ratio of liquids and liquid feed pressure.

Further, the microreactor of the present invention, comprising:

a plurality of the reagent storage sections, a plurality of the reagent feed-out flow paths; and a junction at which each of the plurality of the reagent feed-out flow paths meets, wherein a ratio between a fluid resistance of each of the air evacuation flow paths when a liquid flows therethrough is preferably substantially the same as a ratio between a flow path resistance of each of the flow channels when a liquid flows therethrough, the flow channel which starts from the branch section as a starting point and includes from the reagent storage section to the reagent feed-out flow path.

In the aforementioned invention, in each of the flow paths corresponding to each of the reagents, the ration between the volume of the driving solution leaking out of the air evacuation flow path and the volume of the reagent flowing into the junction is substantially the same. This ensures easy control of the micro-pump as an external pump. To put it another way, the voltage control of each of the micro-pumps for pushing out various reagents by feeding out the driving solution can be simplified, for example, unified. There is no need of using complicated control for each micro-pump to keep the reagent mixing ratio constant.

Further, the microreactor of the present invention preferably comprises:

a reservoir section which is provided on an exit side of the air evacuation flow path for reserving the driving solution fed out through the air evacuation flow path.

Installation of a liquid reservoir section having a predetermined capacity ensures that the driving solution leaking from the air evacuation flow path can be accommodated into a predetermined site. This eliminates the possibility of the driving solution leaking from the chip or moving to an unwanted site.

The aforementioned invention preferably comprises:

an opening which is communicated with the reservoir section and whose distal end is open to an outside; and a water-repellent valve which is provided between the opening and the reservoir section; the water-repellent valve including:

a liquid-feed controlling flow passage which connects a flow path on a side of the reservoir section to a flow path on a side of the opening, and have a cross-sectional area smaller than a cross-sectional area of these flow paths, wherein the water-repellent valve prevents the driving solution from passing through to an side of the opening unless a liquid pressure exceeds a predetermined pressure.

Installation of such a water-repellent valve ensures that the air having passed through the air evacuation flow path can escape from the opening to the outside, and avoids possible leakage of the driving solution from the reservoir section through the opening.

Advantage of the Invention

The microreactor of the present invention ensures high-precision control of timing for mixing liquids such as reagents, mixing ratio of liquids and liquid feed pressure, without air being caught between the driving solution and reagent.

NUMERALS

Figure 1:
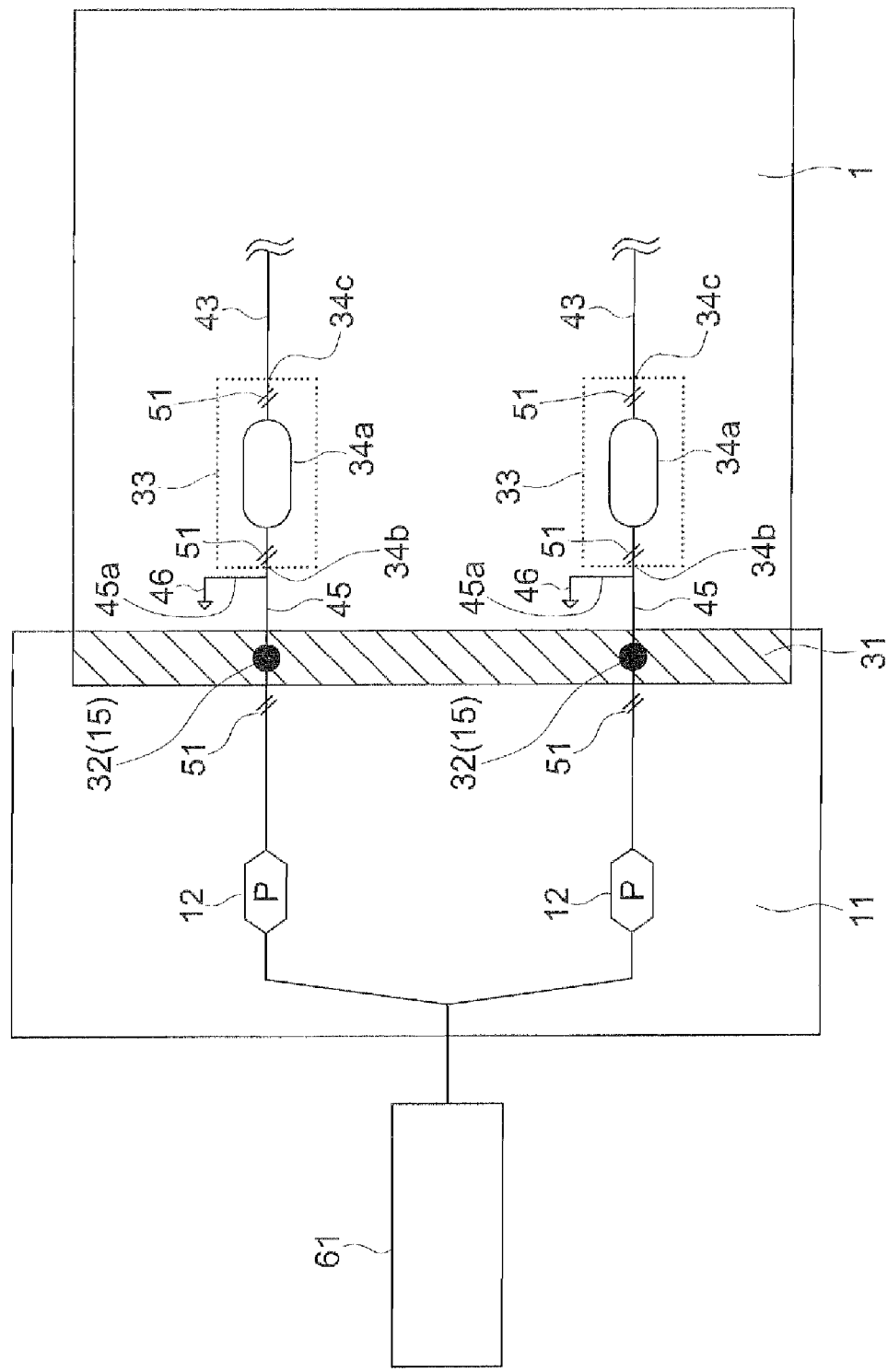
FIG. 1 is a schematic configuration diagram representing connection between a microreactor, micro-pump and driving solution tank in a first embodiment of the present invention.

1 Microreactor
2 Integrated micro analysis system
3 System body
11 Micro-pump unit
12 Micro-pump
13 Chip connection section
14, 15, 15*a*, 15*b*, 15*c* . . . Opening
16*a*, 16*b* . . . Through-hole
17, 18, 19 . . . substrate
20 Flow path
21 Piezoelectric element
22 Pressure chamber
23 1st flow path
24 2nd flow path
25 1st liquid chamber
26 2nd liquid chamber
31 Pump connection section
32, 32*a* to 32*k* . . . Opening
33, 33*a*, 33*b*, 33*c* . . . Reagent storage chamber
34*a* Storage chamber
34*b* Inlet
34*c* Outlet
35 Junction
36 Reagent mixing flow path
37 Sample reception section
38 Junction
39 Reaction section
40 Detection section
41 Junction
42 Reservoir section
43, 43*a*, 43*b*, 43*c* . . . Reagent feed-out flow path
44, 44*a*, 44*b* . . . Flow path beyond the branch section
45 Flow path
45*a* Branch flow path
46, 46*a*, 46*b* . . . Air evacuation flow path
47 Aqueous reagent
48 oily solution (sealant)
49 Aqueous solution
50 Driving solution
51, 51*a*, 51*b*, 52*c* . . . Water-repellent valve
52 Liquid feed controlling flow passage
53*a*, 53*b* . . . Flow path
54 Solution
55 Branch section
56 Opening
57, 57*a*, 57*b* . . . Reagent
61 Driving solution tank
62 Storage member
63 Insertion port
64 Display section
65 Conveyance tray
66 Peltier element
67 Heater
68 Light source
69 Detector
70 Air bubbles

BEST MODE FOR CARRYING OUT THE INVENTION

A microreactor of the present invention is used to cause reaction between sample and reagent for various forms of inspection, chemical analysis, chemical synthesis and processing and separation of the sample in a minute flow path or structural member.

Application of the microreactor of the present invention includes inspection and analysis of the biological substance by gene amplification reaction and antigen-antibody reaction, chemical synthesis of the target compound by the inspection and analysis of other chemical substances and organic synthesis, efficacy screening, extraction of pharmaceuticals, and formation and separation of metal complex.

In a preferred embodiment of the present invention, the microreactor has the following components within the plate like chip:

(i) a plurality of reagent storage sections including a storage chamber for storing a reagent, an inlet for feeding a driving solution into the storage chamber, and an outlet through which the reagent is pushed out of the storage chamber by the driving solution having been supplied;

(ii) a reagent mixing section for preparing a mixed reagent by mixing a plurality of reagents fed out of the plurality of reagent storage sections;

(iii) a sample reception section having an inlet through which a sample is supplied from an outside; and (iv) a reaction section for causing reaction by mixing the mixed reagent fed out of the reagent mixing section with the sample fed out of the sample reception section.

A plurality of the aforementioned reagent storage sections, reagent mixing section, sample reception section and reaction section communicate with one another through flow paths incorporated in the aforementioned chip.

In addition to the aforementioned components, structural members having various forms of functions are provided within the chip, as required. Such a structural member is exemplified by a member for controlling the liquid feed, a storage section for storing processed solution other than sample and reagent, a pre-processing section for providing pre-processing prior to the reaction with the reagent for the purpose of removing unwanted components contained in the biological sample and others, a detection section for detecting target substances included in the solution after reaction, and a waste liquid reservoir section for reversing waste liquid.

The liquid feed control member is exemplified by a check valve, active valve, and water-repellent valve (to be described later).

The storage section for storing various forms of processing solutions is exemplified by a storage section for a cleaning solution for washing a carrier such as a flow path wall and beads in which a required substance is adsorbed; a storage section for a reaction stop solution for stopping the reaction between the reagent and sample; a storage section for a denaturing-process solution for denaturing the reaction product to make it detectable; a storage section for a labeling reagent for labeling the reaction product with a fluorescent substance to ensure optical detection; and other storage sections for storing the extract, eluant, lytic reagent and hemolytic reagent.

When a reaction product in the microreactor is to be optically detected, the detection section is made up of a flow path portion or liquid reservoir portion formed of an optically transparent member, for example.

The processing section is used for concentration, separation and bacteriolysis of the analysis target substance contained in the sample. For example, it removes the protein and ionic substances contained in the biological sample. In this process, a carrier such as a filter, bead, gel or membrane is arranged inside the flow path so as to adsorb the biological substance, and lytic reagent and hemolytic reagent is fed into the flow path. Then the cleaning solution is supplied thereto.

The waste liquid reservoir section is made up of a space which is formed by the process wherein a substrate having a recessed portion of predetermined dimensions formed thereon is laminated on the lower surface of the substrate for flow paths, wherein this space communicates with the flow path. If required, this space accommodates such a porous member as a sponge to absorb waste liquid.

The microreactor is produced in a plate like substrate by photolithographic technique and microfabrication technique. In common practice, the recessed portion serving as a flow path is formed in one or two substrates, and a plurality of the substrates are laminated each other, whereby a microreactor is produced.

Various forms of materials can be used to produce the substrate constituting the microreactor according to the application purposes. The examples of these materials include a plastic resin such as polyethylene, a rubber material such as polydimethyl siloxane, various forms of inorganic glass, silicon, ceramic and metal. Further, the wall surface of the flow path can be subjected to hydrophobic process or the like, in conformity to a particular requirement.

The width of the flow path in the microreactor is properly determined by giving consideration to the advantages of the micro-scale space, and flow path resistance. For example, the width is in the range of several tens through several hundred μm, preferably in the range of 50 through 200 μm. The depth is in the range of 25 through 300 μm, preferably in the range of 50 through 100 μm. The overall height and width size of the microreactor chip is several tens of mm, although it depends on the application, and the height is typically several mm.

The sample reception section of the microreactor of the present invention includes a storage chamber for temporary storage of the sample, and an inlet through which the sample is supplied into the storage chamber from outside. This storage chamber can be formed in various shapes as exemplified by a flow path shape or liquid reservoir shape.

The inlet of the sample reception section is structured in such a way that a trace quantity of samples can be supplied from a chip surface, for example. To avoid leakage to the outside, contamination or infection during use of a biological sample and to ensure good hermeticity, it is preferred that a stopper made of an elastic material such as a rubber-like material should be formed on the inlet, or the inlet is covered with a rubber material such as polydimethyl siloxane or a reinforced film. For example, the sample in the syringe is supplied using a needle sticking the stopper of rubber-like material or a needle piercing through a covered pore. In the former case, the pinhole is preferably closed when the needle is removed. Other sample supply mechanisms can be installed.

The upstream side of the sample reception section communicates with the flow path communicating with the micro-pump, and the downstream side thereof communicates with the mixing section for mixing with a reagent. The sample having been supplied to the sample reception section is pushed downstream by the driving solution supplied by the micro-pump. If needed, the sample is pre-processed before it is mixed with the reagent.

According to the purpose of use, various forms of substances can be supplied as samples into the sample reception section. When the inspection and analysis of the biological substance, an analyte-containing sample can be used, as exemplified by the whole blood, plasma, serum, buffy coat, urine, fecal, saliva, and sputum. For genetic screening, the analyte is a gene, DNA or RNA as the nucleic acid serving as the template for amplification reaction. Further, the substance prepared or isolated from a sample which may contain such nucleic acid can be used as the sample. Other examples include various forms of metabolic substances, hormones and proteins (including enzyme and antigen).

In addition, when chemical synthesis is performed, the sample is the material compound to be reacted with the reagent. If efficacy screening, chemical extraction, formation and separation of the metallic complex are intended, the sample will be the substance to be used for reaction with the reagent to achieve the purpose.

The reagent storage section of the microreactor in the present invention includes a storage chamber for storing the reagent. This storage chamber can be formed in various shapes as exemplified by a flow path shape or liquid reservoir shape. This storage chamber has an inlet through which the driving solution is supplied into the storage chamber, and an outlet from which the reagent is pushed out of the storage chamber by the supplied driving solution.

The inlet provided on the upstream side from the storage chamber communicates with the flow path that communicates with an external micro-pump. To be more specific, the flow path from an opening facing one side of the chip to the inlet of the storage chamber is formed in the chip. When the external micro-pump is connected to the chip, the driving solution is fed into the flow path by the micro-pump and is fed into the storage chamber through the inlet.

The outlet provided on the downstream side from the storage chamber communicates with the mixing section for mixing with other reagents. The reagent in the storage chamber is pushed out downstream through the outlet of the storage chamber by the driving solution sent by the micro-pump.

According to the purpose of use, various forms of substances can be used as the reagents. The reagent used in the present invention is the aqueous solution obtained by dissolving or dispersing the required components in the aqueous solvent. For example, when the gene contained in the specimen is to be amplified by the PCR method, the reagent contains 2'-deoxynucleotide nucleoside 5'-triphosphoric acid, Taq DNA polymerase, Vent DNA polymerase or Pfu DNA polymerase.

Further, when the gene contained in the specimen is amplified by the ICAN (Isothermal chimera primer initiated nucleic acid amplification) process, the reagent includes 2'-deoxynucleotide nucleoside 5'-triphosphoric acid, chimera primer that can be hybridized specifically to the gene to be detected, DNA polymerase of chain labilization, and RNase of endonuclease.

In addition, when the chemical synthesis is intended, the material compound to be reacted with the sample is included in the reagent. If efficacy screening, chemical extraction, formation and separation of the metallic complex are intended, the reagent includes the substance to be used for reaction with the reagent to achieve the purpose.

In genetic screening, reagent is preferably placed in the reagent storage section in advance to ensure quick screening regardless of place an time. In this case, to avoid possible evaporation, leakage, intrusion of air bubbles, or contamination of the reagent to be placed therein, the upstream and downstream sides of the reagent is preferably sealed.

A sealant can be used to seal the reagent storage section. The sealant is solidified or gelated under the cooled condition where the microreactor is stored before use. It is melted into a molten state when heated to the room temperature at the time of use. When the reagent is stored in the microreactor in advance, the microreactor is preferably kept in cold storage in order to ensure stability of the reagent. By using a substance which is solid at the time of cold storage as a sealant and is liquefied at room temperature, the substance is in the state of solid at the time of cold storage to seal the reagent, and the liquefied substance at the time of use can be easily discharged from the flow path.

Such a sealant can be exemplified by a aqueous solution of oils, fats and gelatine characterized by a solubility in water of 1% or less, and a melting point of from 8° C. to the room temperature (25° C.). The gelation temperature of the aqueous solution of gelatine can be controlled by changing the density of the gelatine. For example, to achieve gelation temperature of about 10° C., the aqueous solution of about 1% should be used.

The aforementioned sealant is used to be filled in at the inlet and outlet of the storage chamber of the reagent storage section sandwiching the reagent. Regarding the form of sealing with sealant, the sealant may be filled in the flow path to seal the flow path. Alternatively, the sealant may be filled in a liquid reservoir provided for the sealant.

Figure 2:
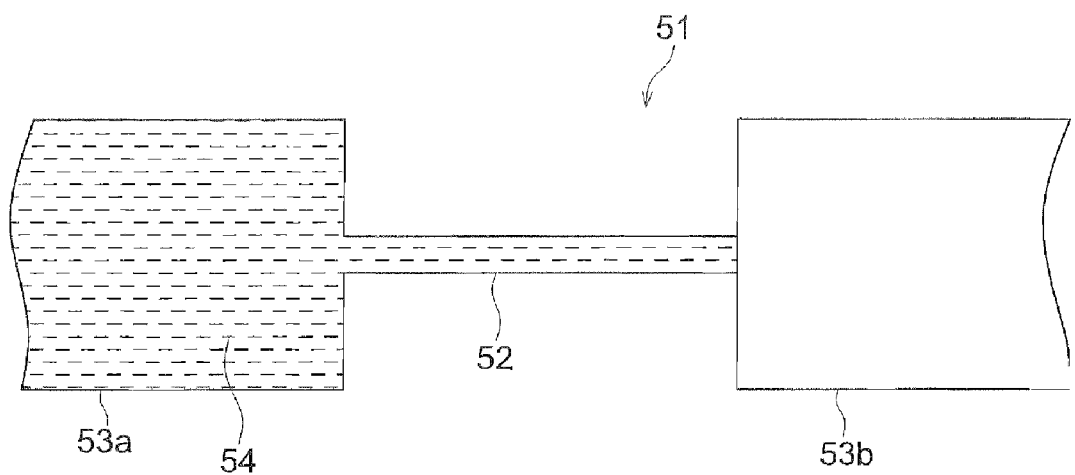
FIG. 2 is a diagram showing a water-repellent valve.

The inlet and/or outlet of the storage chamber of the reagent storage section can be provided with the water-repellent valve (to be described later) of FIG. 2. This effectively prevents the reagent from leaking out when the microreactor is stored, and the reagent is easily pushed out to the outside by the micro-pump at the time of use.

The micro-pump feeds the reagents in the reagent storage section and liquids in other storage sections to the downstream side. A plurality of micro-pumps are normally installed corresponding to the liquids to be fed out. Each micro-pump feeds the driving solution to the downstream side and sends the driving solution to feed the sample and reagent to the downstream side.

In the present invention, the micro-pump is separate from the microreactor, namely, independent of the plate like chip. It is possible to mention the case of the sample inspection apparatus being composed of an apparatus body and a microreactor sealed with reagent in advance, the apparatus body which is equipped with the micro-pump and its control apparatus, optical detection apparatus for reaction detection, temperature control apparatus, and driving solution tank for storing the driving solution.

In this case, the sample is supplied into the sample reception section of the microreactor. After that, the microreactor is mounted on the apparatus body, and communication is provided between a plurality of micro-pumps on the side of the apparatus body and each of the flow paths of the microreactor corresponding to the micro-pumps. Under this condition, the driving solutions from the driving solution tank are fed out into the flow paths of the microreactor by the micro-pumps. Thus, the liquid in the flow path as exemplified by the reagent in the reagent storage section and sample in the sample reception section are fed out to the downstream side, and mixing between the reagents and mixing between the reagent and the sample are then carried out.

The micro-pump is produced by the photolithographic technique. Various types of micro-pumps are used, as exemplified by the micro-pump driven by the piezoelectric element disclosed in the Unexamined Japanese Patent Application Publications Nos. 2001-322099 and 2004-108285; and the check valve type micro-pump having a check valve installed in the inlet and outlet of the valve chamber. The aforementioned micro-pump driven by the piezoelectric element is provided with a first flow path whose flow path resistance varies depending on the amount of pressure difference; a second flow path where the percentage of change in the flow path resistance depending on the change in the amount of pressure difference is smaller than that of the first flow path; a pressure chamber communicating with the first and second flow paths; and an piezo actuator for changing the internal pressure of the pressure chamber. This actuator is driven by voltage through a separate control apparatus, whereby the liquid can be fed in the forward and reverse directions.

In the present invention, an aqueous solution such as pure water or buffer liquid is preferably used as the driving solution, and the aforementioned aqueous reagent is preferably pushed out by the aqueous driving solution.

A plurality of reagents having been pushed out of the respective reagent storage sections by the driving solution merge one another at the reagent mixing section located downstream, and are mixed together. The reagent mixing section is a single minute flow path extending beyond the junction of those flow paths where a plurality of reagents are respectively fed out. The mixed reagent having been mixed in this flow path will merge with the sample in the further downstream side, where reaction takes place.

In the reaction section, a mixture of the sample and mixed reagent is introduced therein. After that, reaction is initiated by raising temperature, for example. The reaction section can be designed in any shape, as can be exemplified by the shape of a liquid reservoir or flow path. For example, the sample and mixed reagent are stored in the liquid reservoir, where reaction is performed. Alternatively, the sample is merged with the mixed reagent, and the direction of feeding the mixed liquid is switched by the micro-pump. The confluent liquid is repeatedly moved forward and backward in the minute flow path, whereby reaction is performed. The reaction section may be formed in a proper shape according to types of sample and reagent.

The following describes the present invention with reference to the drawing: FIG. 1 is a schematic configuration diagram representing connection between a microreactor, micro-pump and driving solution tank in a first embodiment of the present invention. In this drawing, the chip-like microreactor 1 and chip-like micro-pump unit 11 are overlapped with each other at the pump connection section 31 (hatched portion). The flow path of the microreactor 1 shown in the drawing refers to only the portion on the periphery of the reagent storage section 33 and the upstream side thereof.

The reagent storage section 33 is provided with a storage chamber 34a where reagent is stored. The inlet 34b of the driving solution and the outlet 34c of the reagent are arranged on the upstream side and the downstream side from the storage chamber 34a respectively.

In this embodiment, the inlet 34b and outlet 34c are provided with a water-repellent valve 51. The water-repellent valve 51 has the structure shown in FIG. 2. The water-repellent valve 51 is equipped with a liquid feed controlling flow passage 52. The liquid feed controlling flow passage 52 has a minute flow path whose cross sectional area (area of the cross section perpendicular to the flow path) is smaller than those of the flow path 53a on the upstream side and the flow path 53b on the downstream side.

When the flow passage wall is made of a hydrophobic material such as a plastic resin, the difference of surface tension between the liquid 54 and the wall of the flow passage controls passage of the solution 54 in contact with the liquid feed controlling flow passage 52 to the flow path 53b.

In order to feed the solution 54 onto the flow path 53b on the downstream side, the liquid feed pressure above a predetermined level needs to be applied by the micro-pump. This pressure, against the surface tension, pushes the solution 54 through the liquid feed controlling flow passage 52 onto the flow path 53b on the downstream side. After the solution 54 has once flown out to the flow path 53b, the solution flows to the flow path 53b on the downstream side even it the liquid feed pressure enough for pushing the leading edge of the solution 54 toward the flow path 53b onto the downstream side is decreased. To put it another way, the passage of solution beyond the liquid feed controlling flow passage 52 is blocked unless the liquid feed pressure in the positive direction from upstream to downstream is equal to or higher than a predetermined level, and when the applied liquid feed pressure exceeds the predetermined level, the solution 54 is allowed to pass through the liquid feed controlling flow passage 52.

When the flow passage wall is made of a hydrophilic material such as glass, at least the inner surface of the liquid feed controlling flow passage 52 must be provided with water-repellent coating, as exemplified by fluorine-based coating.

There is no particular restriction to the dimensions of the flow path 53a, flow path 53b and liquid feed controlling flow passage 52, as long as the liquid flow controlling passage 52 can control the liquid passing through to the flow path 53b. For example, the liquid feed controlling flow passage 52 is produced to have the dimensions of about 25 μm×25 μm with respect to the flow path 53a and flow path 53b having the dimensions of 150 μm×300 μm.

Figure 3:
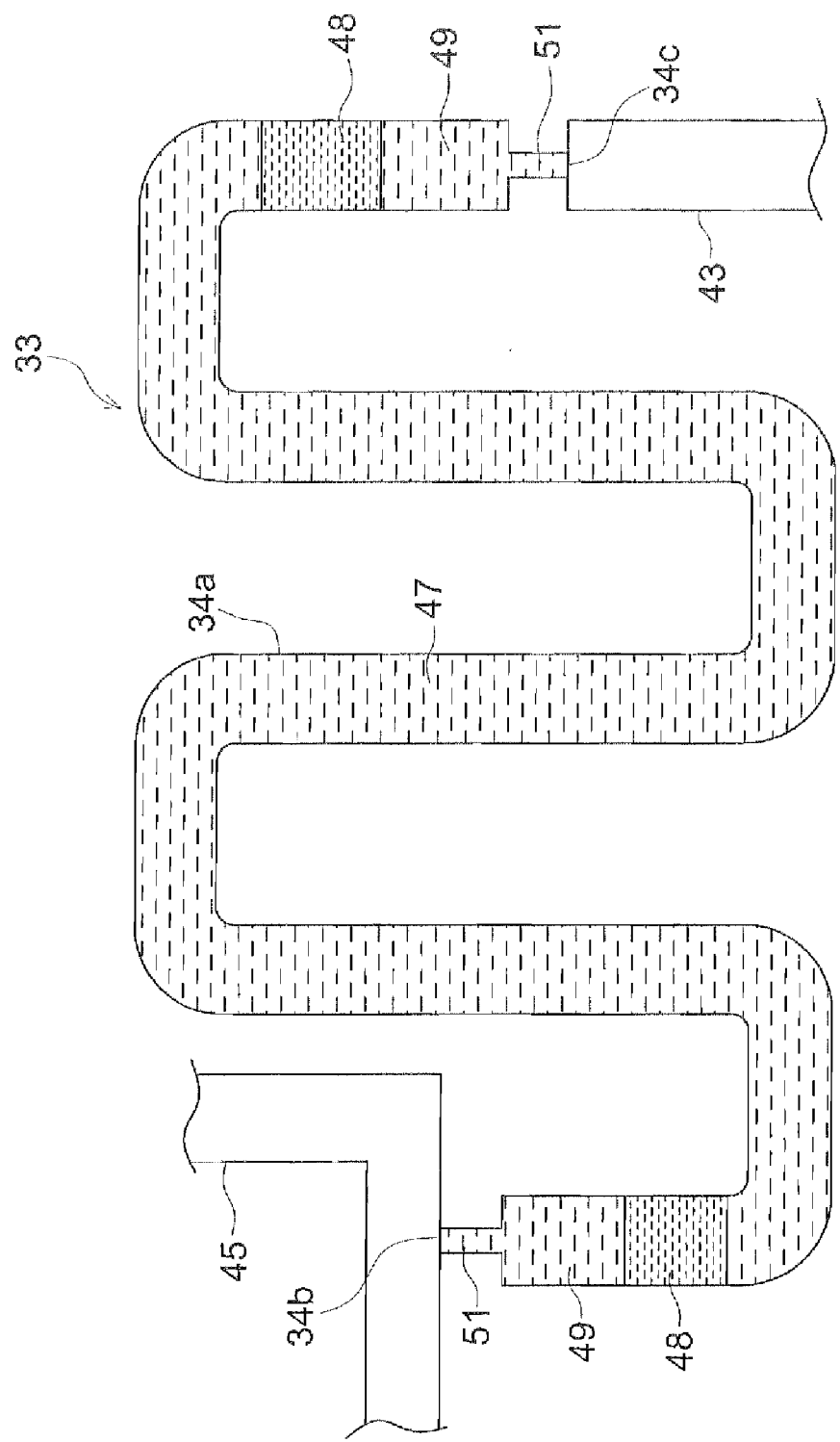
FIG. 3 is a diagram showing a reagent storage section in the first embodiment of the present invention.

FIG. 3 is a diagram showing a reagent storage section in the first embodiment of the present invention. The oily solution 48 in contact with the aqueous reagent 47 at the interfacial boundary and aqueous solution 49 in contact with the oily solution 48 on the interfacial boundary are contained in each of the inlet 34b and outlet 34c of the reagent storage section 33 in that order.

The aqueous solution 49 stored on the most upstream side and on the most downstream side of the reagent storage section 33 are kept in contact with the water-repellent valve 51 so as to prevent the leading edge thereof from flowing into the flow path ahead of them.

To put it another way, the flow path wall is made of a hydrophobic material such as plastic resin, and the aqueous solution 49 in contact with the water-repellent valve 51 is prevented from flowing out of the storage chamber 34a by the difference of surface tension between the solution and the flow path wall.

As shown in the schematic diagram of FIG. 1, the upstream side of the reagent storage section 33 communicates with a micro-pump 12 at the pump connection section 31 of the microreactor 1. In order to let the aqueous reagent flow from the reagent storage section 33 to the flow path on the downstream side, the liquid feed pressure applied by the micropump 12 needs to be equal to or higher than a predetermined pressure is, and this pressure pushes, against the surface tension, the aqueous solution 49 of FIG. 3 through the water-repellent valve 51 of the outlet 34c onto the reagent feed-out flow path 43. After the aqueous solution 49 has flowed out, the solution stored in the reagent storage section 33 follows, even if the liquid feed pressure enough for pushing the leading edge of the aqueous solution 49 beyond the water-repellent valve 51 is decreased.

The oily solution 48 of FIG. 3 is used to prevent the aqueous reagent 47 from transpiring (and loss by leakage, entry of bubbles, contamination and denaturation) while the micro actuator is kept in storage and it corresponds to the aforementioned sealant. The oily solution 48 that can be used for this purpose includes the solution that is solidified under the cold storage conditions when the micro-pump is kept in storage and is melted down into fluid state when the microreactor is placed in the environment of room temperature. This can be exemplified by oils and fats having water solubility of equal to or less than 1%, as described above.

The reagent storage section 33 may has a shape of a wide liquid reservoir, in addition to the shape of a slender flow path in FIG. 3. The reagent storage section 33 can be provided with liquid reservoir type reservoir sections where the oily solution 48 and aqueous solution 49 are separately stored.

In the microreactor of FIG. 1, an opening 32 is provided on the upstream side from the inlet 34b of the reagent storage section 33. This opening 32 communicates with the inlet 34b of the reagent storage section 33 through the flow path 45. It opens out of one side of the chip.

In the meantime, a plurality of micro-pumps 12 are formed on the chip-shaped micro-pump unit 11 by microfabrication technology. In this micro-pump unit 11, an opening 15 is formed on the downstream side from the micro-pump 12. This opening 15 communicates with the micro-pump 12 through the flow path and opens out of one side of the chip.

The opening 32 of the microreactor 1 and the opening 15 of micro-pump unit 11 are positioned and are placed one on top of the other, whereby the microreactor 1 is connected with the micro-pump unit 11 while the micro-pump 12 communicates with the reagent storage section 33.

The micro-pump unit 11 is connected with the accommodation section 61 on the upstream side, and the driving solution from the driving solution tank 61 is supplied to each micro-pump 12. The driving solution is led from the opening 32 to the microreactor 1 by the drive of the micro-pump 12 and is supplied into the storage chamber 34a of the reagent storage section 33 from the inlet 34b through the flow path 45. Thus, the reagent sealed inside the storage chamber 34a is pushed out of the outlet 34c and is further fed to the reagent feed-out flow path 43.

In the present invention, a branch flow path 45a branching off from the inlet 34b is arranged in the flow path 45 between the opening 32 and inlet 34b of the microreactor in FIG. 1. An air evacuation flow path 46 is provided on this branch flow path 45a.

Figure 4:
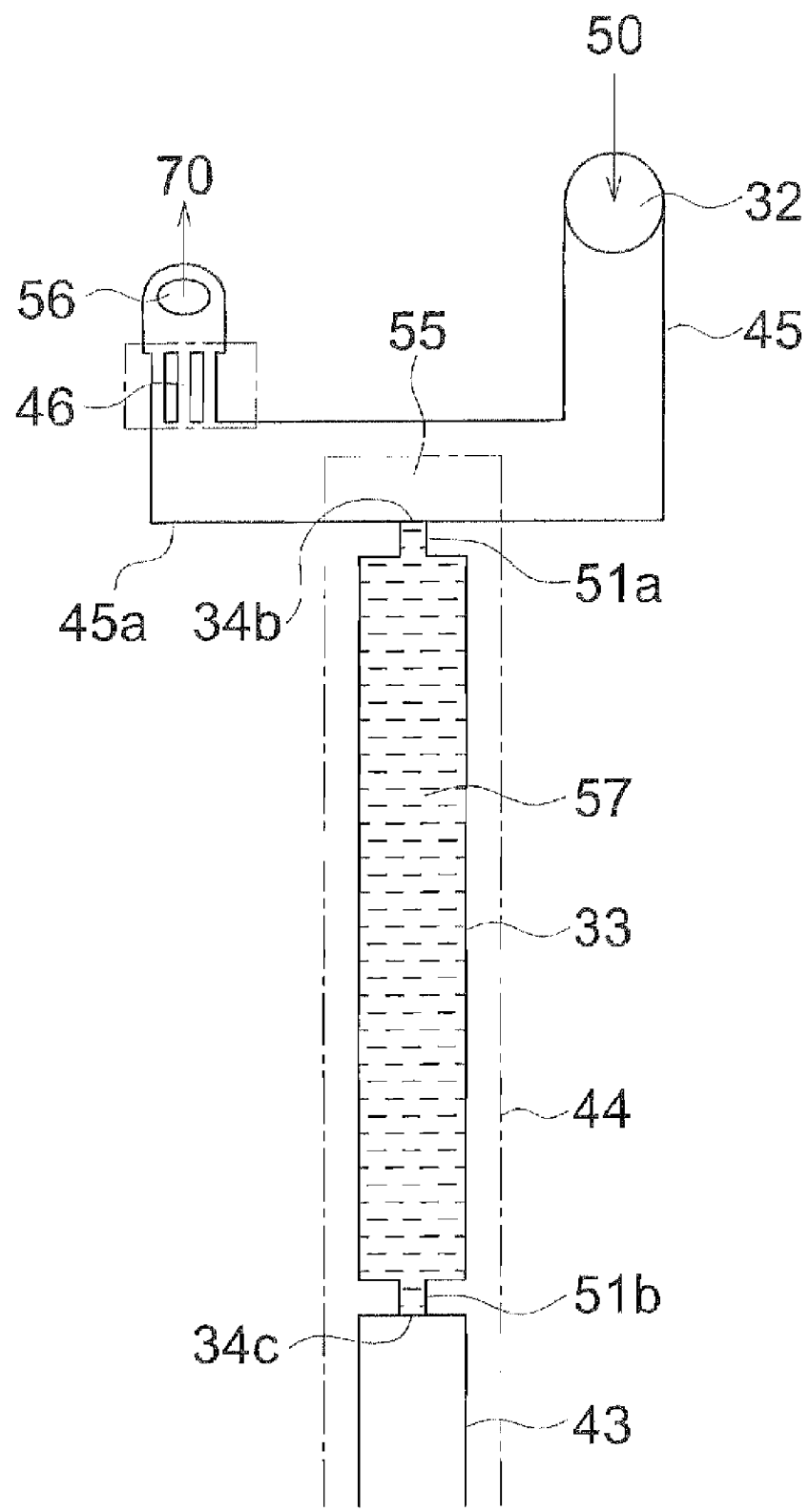
FIG. 4 is a diagram representing the structure of an air evacuation flow path provided on the upstream side from the reagent storage section and flow paths provided on the periphery thereof in the first embodiment of the present invention.
Figure 5:
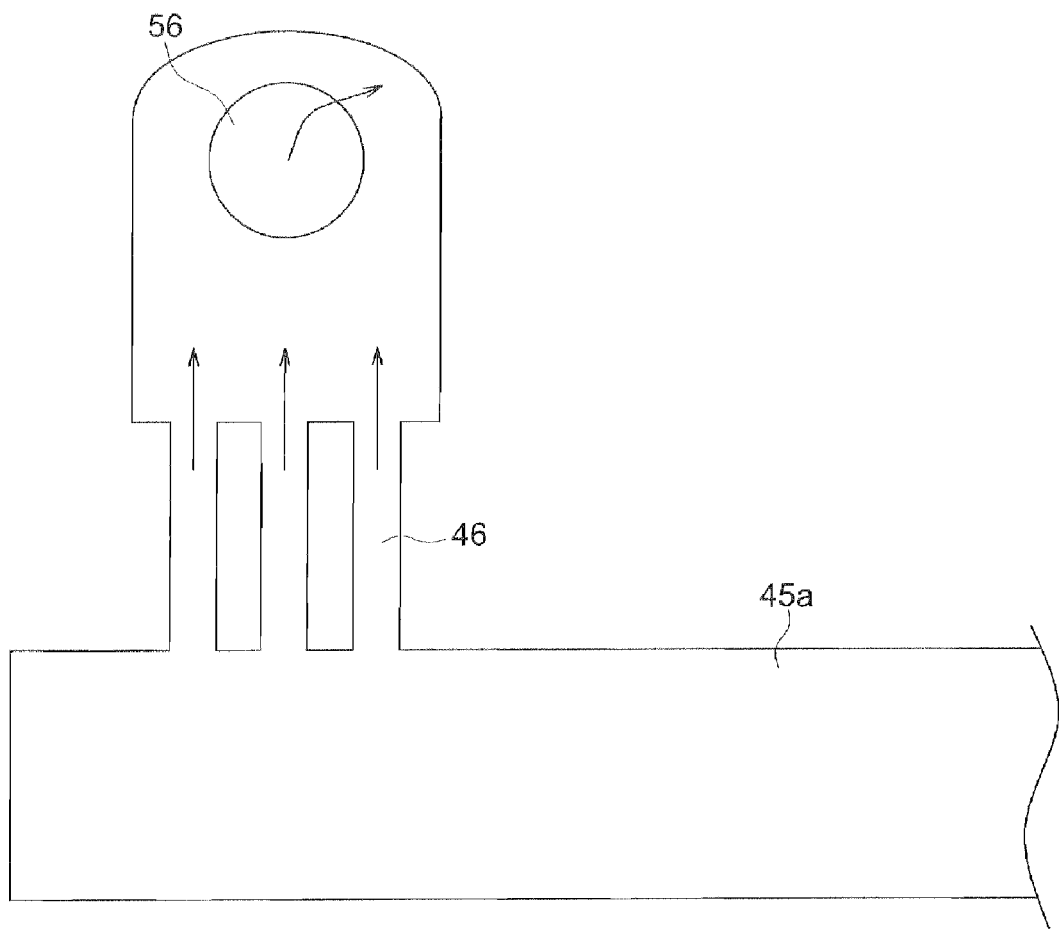
FIG. 5 is an enlarged view of the air evacuation flow path.

FIG. 4 is a diagram representing the structure of an air evacuation flow path arranged on the upstream side from the reagent storage section and flow paths provided on the periphery thereof in a first embodiment of the present invention. FIG. 5 is an enlarged view of the air evacuation flow path. As illustrated, the branch flow path 45a branched off from the branch section 55 of the inlet 34b is provided through the flow path 45 which runs to the reagent storage section 33 from the opening 32 communicating with the micro-pump.

The branch flow path 45a is provided with the air evacuation flow path 46 whose end is open to the outside. The air evacuation flow path 46 is a flow path of small diameter extending from the flow path wall of the branch flow path 45a. For example, arrangement is made in such a way that a plurality of paths extend from the side of the branch flow path 45a, as shown in FIG. 5. The air evacuation flow path 46 may be arranged at the end of the branch flow path 45a, and the number of the air evacuation flow paths 46 may be one or more than two depending on cases.

The air bubbles between the driving solution and the reagent in the flow path 45 is removed from the air evacuation flow path 46 in the initial stage of feeding out the driving solution. According to the preferred embodiment of the present invention, the aqueous reagent is pushed out by the aqueous driving solution such as pure water or buffer water in the flow path of the microreactor made of a hydrophobic material such as a resin or rubber or in the flow path of the microreactor whose inner wall of the flow path is provided with hydrophobic treatment. In this case, the air evacuation flow path preferably has a diameter of 15 μm or less, and contact angle with water on the inner surface of the flow path is 30° or more. Here, when the cross section of the flow path is rectangular, the diameter of the flow path denotes the length of either the longitudinal or lateral side of the rectangular, and preferably the length of both the longitudinal and lateral sides.

In the present embodiment, the opening 56 that is open on one side of the chip (upper side of the paper in FIG. 5) for communication with atmosphere is arranged beyond the ends of a plurality of the air evacuation flow paths 46. The air bubbles coming out of the air evacuation flow path 46 are released into the atmosphere through the opening 56.

In the case where the air evacuation flow paths are provided directly on the way of the flow path 45, if the water-repellent valve 51a is installed at the inlet 34b of the reagent storage section 33 as shown in FIG. 4, air bubbles tend to remain between the place where the air evacuation flow paths are arranged and the place where the water-repellent valve 51a is arranged. In contrast, the branch flow path 45a is provided in the present embodiment. Because of this arrangement, air bubbles are drawn by the branch flow path 45a instead of remaining upstream of the water-repellent valve 51a, and pass through the air evacuation flow path 46 extending from the branch flow path 45a to be released to the outside. Thus, in the flow path 45 extending from the opening 32 to the reagent storage section 33, stable liquid feed is ensured, without bubbles being caught inside.

In FIG. 4 representing the status prior to the driving solution being fed out, the space between the water-repellent valves 51a and 51b on both ends of the reagent storage section 33 is filled with reagent 57. The flow path 45 is filled with air and does not contain liquid.

Figure 6:
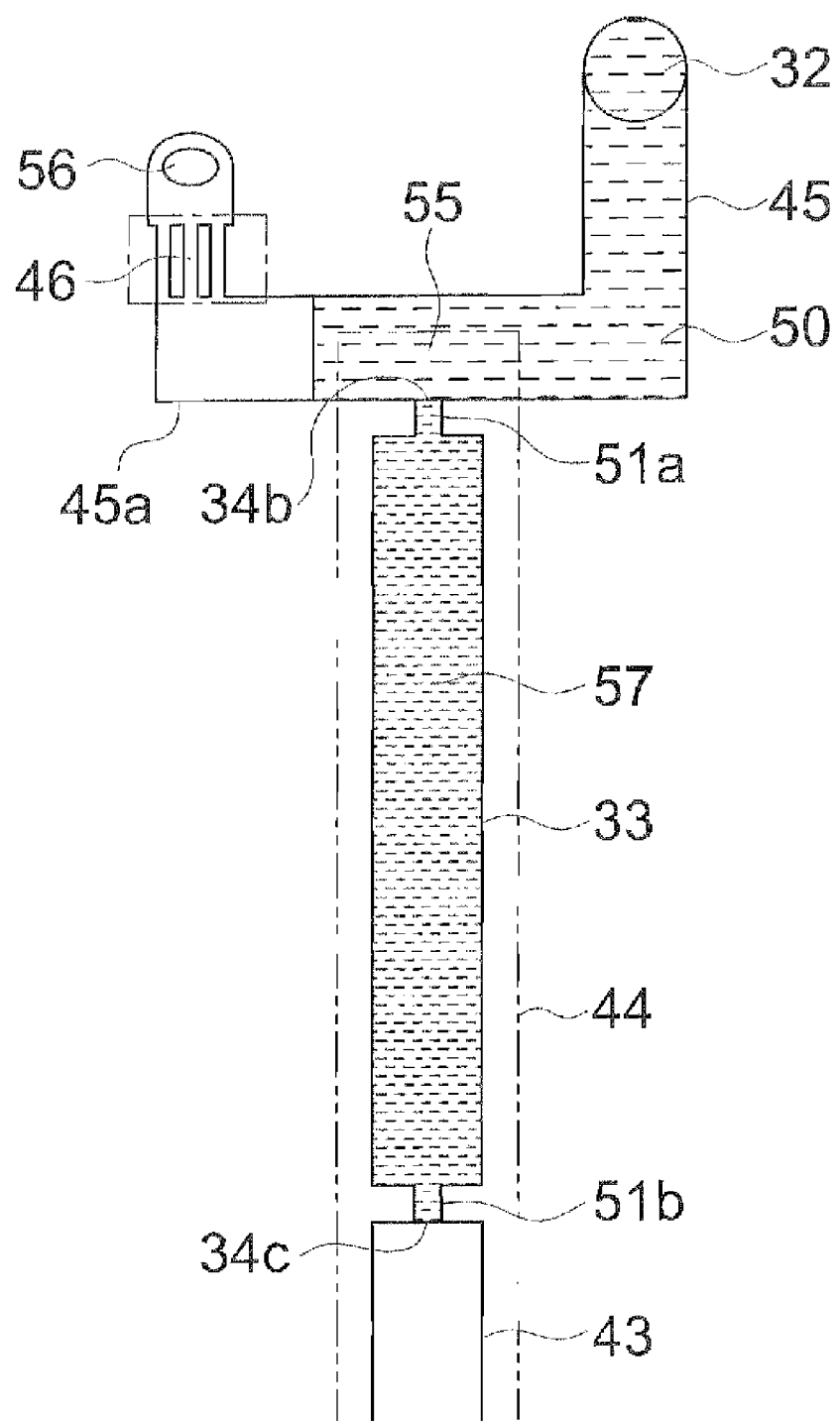
FIG. 6 is a diagram showing how the branch flow path is filled with driving solution in the state of FIG. 4.

In the status shown in FIG. 4, the driving solution is fed from the opening 32 into the flow path 45 by a micro-pump (not illustrated). Then the branch flow path 45a branched off from the branch section 55 is filled with the driving solution 50, as shown in FIG. 6. In this case, air present in the flow path 45 and branch flow path 45a is released to the outside through the air evacuation flow path 46.

Figure 7:
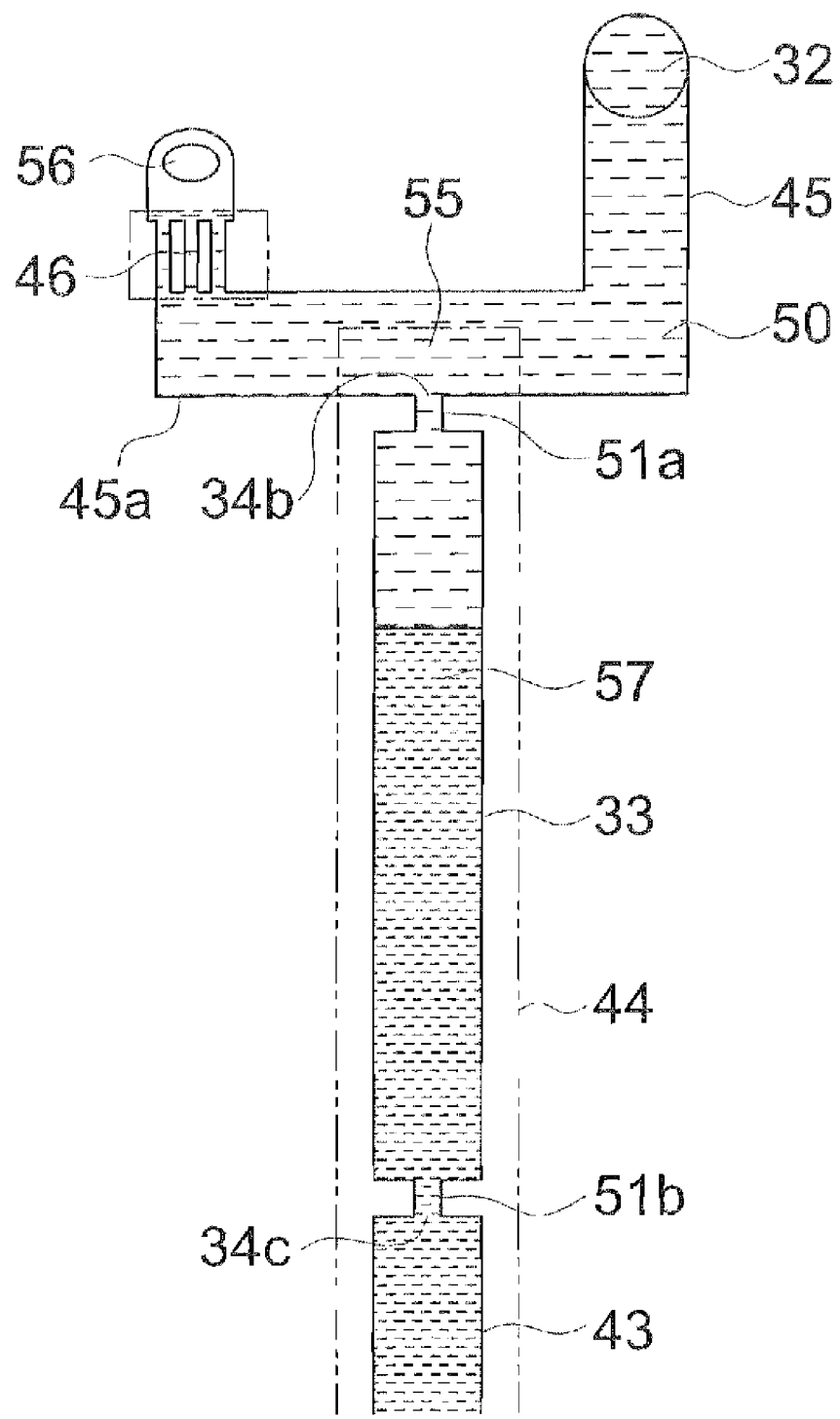
FIG. 7 is a diagram showing how the reagent is pushed out by the driving solution after the branch flow path is filled with the driving solution in the state of FIG. 6.

While air is removed from the air evacuation flow path 46, the branch flow path 45a is filled with driving solution 50. This allows the driving solution 50 to flow into the air evacuation flow path 46. This causes a great increase in the flow path resistance of the air evacuation flow path 46, and the liquid feed pressure of the micro-pump gives a heavy effect to reagent through the driving solution 50. Thus, the liquid feed pressure in excess of the liquid holding capacity is applied to the water-repellent valve 51b on the downstream side from the reagent storage section 33. This arrangement ensures the reagent 57 to be pushed out of the reagent storage section 33 by the driving solution 50, as shown in FIG. 7. The reagent 57 passes through the water-repellent valve 51b and is fed out into the reagent feed-out flow path 43 on the downstream side thereof.

The water-repellent valve 51a arrangement on the upstream side from the reagent storage section 33 and the water-repellent valve 51b arrangement on the downstream side from the reagent storage section 33 each have a function of holding the reagent 57 filled therein. Further, the water-repellent valve 51b has the function of feeding out the reagent 57 downstream, namely, the role of controlling the liquid feed when the pressure in excess of a predetermined level is applied to the solution.

In the present invention, the flow path resistance when the solution flows through the air evacuation flow path is configured to be greater than the flow path resistance when the solution flows through the flow channel starting from the branch section and including from the reagent storage section to the reagent feed-out flow path. This flow path resistance is preferably increased more than ten times, more preferably increased more than thirty times. As the leakage of the driving solution into the air evacuation flow path is smaller, the reagent liquid feed accuracy will be higher. If the flow path resistance of the air evacuation flow path is ten times or higher than the flow path resistance of the flow cannel including from the reagent storage section to the reagent feed-out flow path 43, the leakage of the driving solution does not exceed 10 percent of the total liquid feed. Thus, the variation in the reagent feed rate can be kept at less than several percent, despite a slight variation in the leakage of the driving solution. To be more specific, in the present embodiment, as shown in FIGS. 4, 6 and 7, the microreactor is configured so that the flow path resistance when the driving solution 50 flows into the air evacuation flow path 46 is ten times or more than the flow path resistance when the solution flows through the flow channel 44 starting from the branch section 55 and including from the reagent storage section 33 to the reagent feed-out flow path 43.

Aqueous driving solution is preferably used as the driving solution. If the viscosity thereof is almost the same, the flow path resistance when the aqueous solution flows through the air evacuation flow path is almost the same independent of types of solution.

In the present invention, the flow path resistance when the air flows through the air evacuation flow path is preferably lower than the flow path resistance of the flow channel when the solution flows therethrough, where the flow channel starts from the branch section and includes from the reagent storage section to the reagent feed-out flow path. To put it another way, in the present embodiment, the flow path resistance when air flows through the air evacuation flow path 46 is smaller than the flow path resistance when the solution flows through the flow channel starting from the branch section and including from the reagent storage section 33 to the reagent feed-out flow path 43, as shown in FIGS. 4, 6 and 7.

Assuming that the pressure loss when fluid passes through the flow path is $\Delta P$, the flow path resistance R ($N \cdot s/m^3$) can be expressed by $R = \Delta P / Q$. Therefore, the value of the flow path resistance is obtained as follows: Fluid is fed and the flow rate of the fluid is measured while a certain pressure is applied to the inlet of the flow path, and the pressure is divided by the flow rate to obtain the flow path resistance. For example, the effective internal flow path resistance $R_{in}$ of the liquid feed micro-pump can be determined as $R_{in} = P/Q$, where Q is the flow rate Q and P is a generated pressure at a predetermined drive voltage.

The flow path resistance R can be expressed by the following Formula when the flow path is sufficiently slender and the laminar flow is dominant, as in the microreactor of the present invention.

$$R = \int [32 \times \eta / (S \times \phi^2)] dL$$

wherein $\eta$ is the viscosity of the fluid, S is the cross-sectional area of the flow path, $\phi$ is the equivalent diameter of the flow path, and L is the length of the flow path. When the cross section of the flow path is rectangular, the equivalent diameter $\phi$ can be expressed by the following Formula:

$$\phi = (a \times b) / [(a+b)/2]$$

wherein "a" is flow path width "b" is height.

Due to the difference in the viscosities of air and driving solution, the flow path resistance for air flowing through the air evacuation flow path is different from that for the driving solution flowing therethrough. The viscosity of air at 25° C. is about 0.018 mPa·s. However, when the viscosity of the driving solution is about the same as that of water, the viscosity is about 0.89 mPa·s at 25° C. Thus, there is a difference of about 50 times in the flow path resistances of the air evacuation flow path between air flowing therein and driving solution flowing therein.

As described above, in the present embodiment, the flow path resistance when the driving solution 50 flows through the air evacuation flow path 46 is sufficiently higher than that when the liquid flows through the flow path 44. Thus, control can be provided to minimize the amount of the driving solution 50 leaking out through the air evacuation flow path 46 after air has been removed through the air evacuation flow path 46.

Thus, even if the driving solution 50 leaks out through the air evacuation flow path 46, the intended liquid feed operation is not affected. Further, the step of removing air ensures high-precision control of the timing of mixing a solution such as reagent, mixing ratio of solutions, and liquid feed pressure on the downstream side from the reagent feed-out flow path 43.

A high degree of accuracy in the micro-structure of the air evacuation flow path 46 is essential to ensure complete prevention of the driving solution 50 leaking from the air evacuation flow path 46. Further, it is necessary to select a material of sufficient water repellency However, in the present invention, a trace quantity of driving solution 50 is allowed to leak through the air evacuation flow path 46. This arrangement does not required a high degree of accuracy in the micro-structure, further, there is little restriction in the selection of material.

The flow path resistance when air flows through the air evacuation flow path 46 is smaller than that when the solution flows through the flow path 44. Thus, in the initial phase of feeding the driving solution 50 into the reagent storage section 33, the driving solution 50 flows into the branch flow path 45*a*, without pushing out the reagent 57 of the reagent storage section 33, and fills the branch flow path 45*a* while removing air through the air evacuation flow path 46.

As shown in FIG. 7, when the driving solution 50 can flow into the air evacuation flow path 46 after completely removing the air, there is a substantial increase in the flow path resistance of the air evacuation flow path 46, so that the driving solution 50 flows into the reagent storage section 33. Thus, the reagent 57 is pushed out downstream.

As described above, complete elimination of air can be achieved. This ensures high-precision control of the timing of mixing a solution such as reagent, mixing ratio of solutions, and liquid feed pressure on the downstream side from the reagent feed-out flow path 43.

When the outlet 34*c* of the reagent storage section 33 is provided with the water-repellent valve 51*b* as in the present embodiment, the driving solution 50 is preferably fed so that the following Formula is satisfied by the flow rate Q of the driving solution 50 flowing from the opening 32 into the branch section 55 under the micro-pump control:

$$P/R_L \leqq Q \leqq P/R_A$$

wherein P is the pressure at which the water-repellent valve 51*b* allows passage of reagent 57; $R_A$ is the flow path resistance when air flows through the air evacuation flow path 46; and $R_L$, is the flow path resistance when the driving solution 50 flows through the air evacuation flow path 46.

When the aqueous solution 49 is stored in the downstream end of the reagent storage section 33 as shown in FIG. 3, the aforementioned pressure P corresponds to the pressure at which the water-repellent valve 51*b* allows passage of the aqueous solution 49.

When the driving solution 50 is fed at the flow rate Q, the flow rate of the driving solution 50 is set at $Q \leqq P/R_A$ in the initial phase of feeding the driving solution 50 into the reagent storage section 33. Thus, the driving solution 50 flows into the branch flow path 45*a*, without pushing out the reagent 57 beyond the water-repellent valve 51*b* of the outlet 34*c* of the reagent storage section 33, and fills the branch flow path 45*a* while removing air from the air evacuation flow path 46.

Further, the flow rate of the driving solution 50 is set at $P/P_L \leqq Q$. When the driving solution 50 begins to flow into the air evacuation flow path 46 after completely removing the air, the water-repellent valve 51*b* is applied the liquid pressure in excess of the pressure for allowing the solution to be held. Thus, the reagent 57 can be pushed out into the reagent feed-out flow path 43 beyond the water-repellent valve 51*b* by the driving solution 50.

Figure 8:
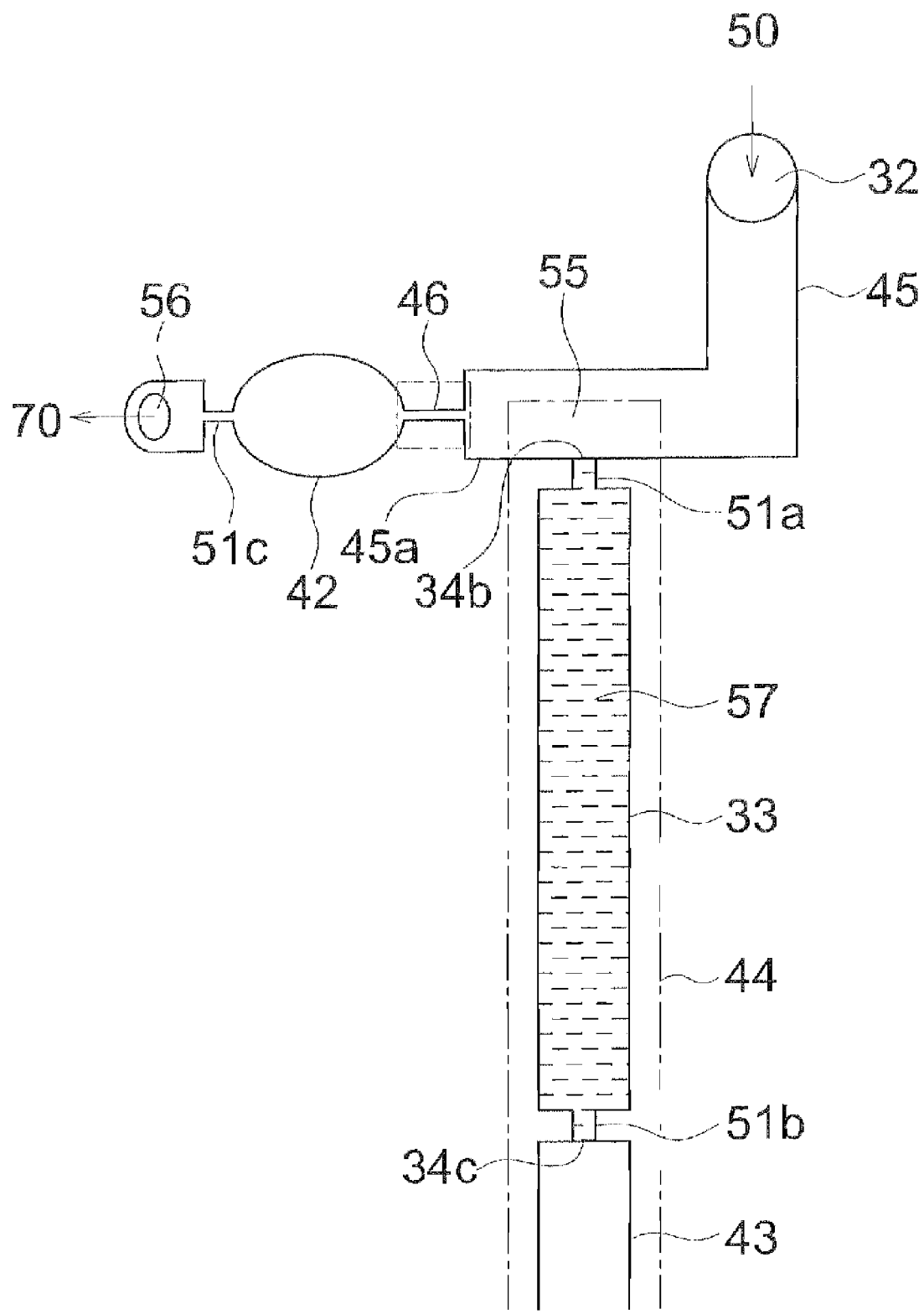
FIG. 8 is a diagram representing the structure of the air evacuation flow path arranged on the upstream side from the reagent storage section and flow paths provided on the periphery thereof in a second embodiment of the present invention.
Figure 9:
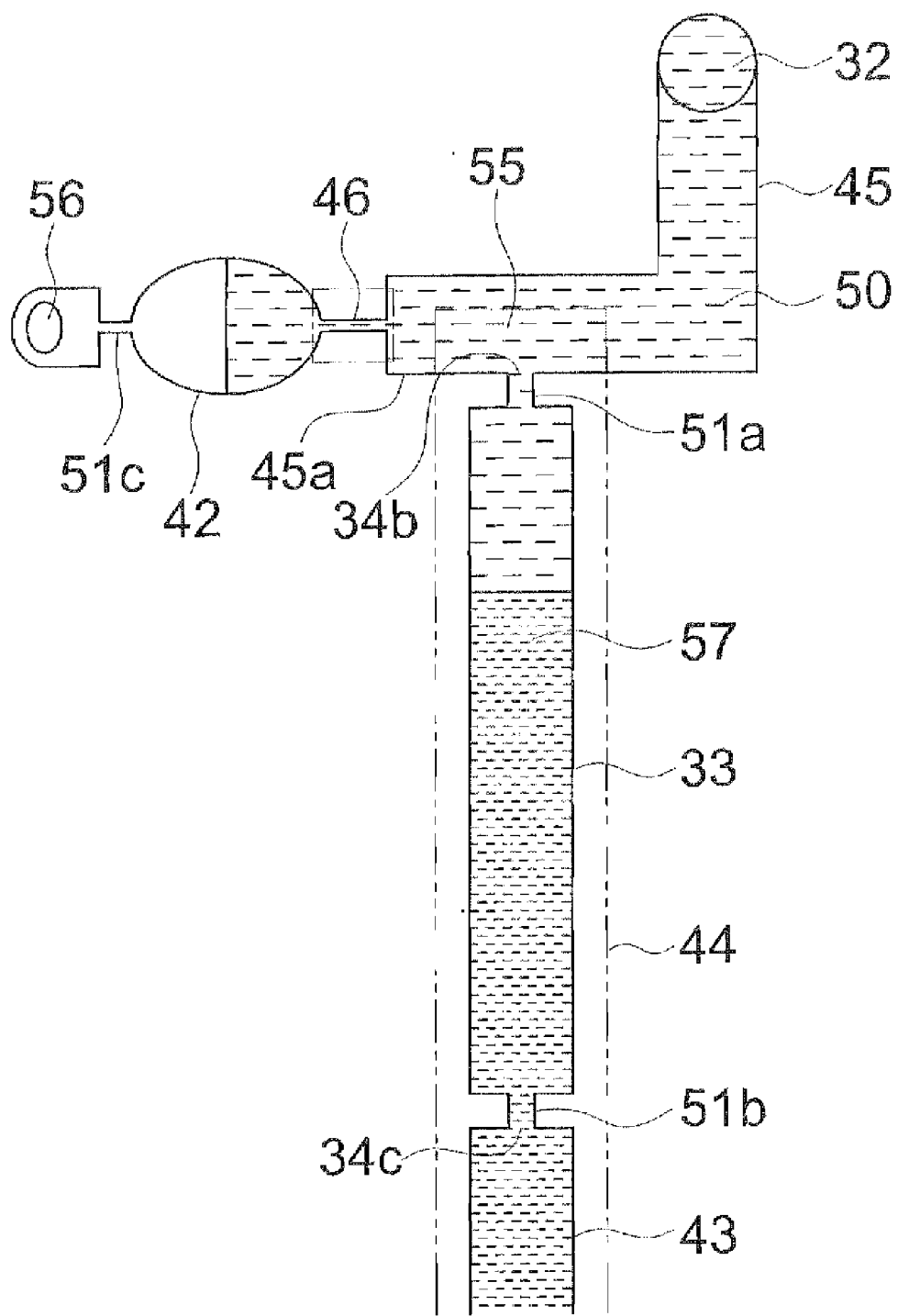
FIG. 9 is a diagram showing how the driving solution enters the air evacuation flow path in the second embodiment of FIG. 8.

FIG. 8 is a diagram representing the structure of an air evacuation flow path arranged on the upstream side from the reagent storage section and flow paths provided on the periphery thereof in the second embodiment of the present invention. FIG. 9 is a diagram showing how the driving solution enters the air evacuation flow path The components corresponding to those of FIGS. 4 through 7 are assigned with the same reference numerals and the detailed description will be omitted to avoid duplication.

In the present embodiment, although the basic configuration is the same as those of FIGS. 4 through 7 a reservoir section 42 for storing the driving solution 50 fed out through the air evacuation flow path 46 is provided on the outlet side of the air evacuation flow path 46.

The reservoir section 42 has an enough capacity to store all the volume of the driving solution 50 leaking through the air evacuation flow path 46 until at least the required volume of reagent is fed out into the flow path downstream of the reagent storage section 33. The reservoir section 42 is formed in a wide liquid reservoir type structure, for example.

The reservoir section 42 is installed as aforementioned. This structure ensures that the driving solution 50 leaking out through the air evacuation flow path 46 can be stored in the reservoir section 42, as shown in FIG. 9. This prevents leakage of the driving solution 50 outside the chip or movement of the driving solution 50 into an unwanted portion.

Further, in the present embodiment, a water-repellent valve 51*c* is arranged between the reservoir section 42 and an opening 56 whose end is open to the atmosphere for communication with the atmosphere and which also communicates with the reservoir section 42. This water-repellent valve 51*c* provides a communication between the reservoir section 42 and a flow path on the side of the opening 56. This water-repellent valve Sic 51 equipped with a liquid feed controlling flow passage (52 in FIG. 2) to block off the passage of the driving solution 50 to the opening 56 unless the liquid pressure of the driving solution 50 exceeds a predetermined level of pressure.

As described above, the installation of the water-repellent valve 51*c* ensures that the air evacuated through the air evacuation flow path 46 escapes to the outside through the opening 56, and prevents the driving solution 50 from leaking out of the reservoir section 42 through the opening 56.

Figure 10:
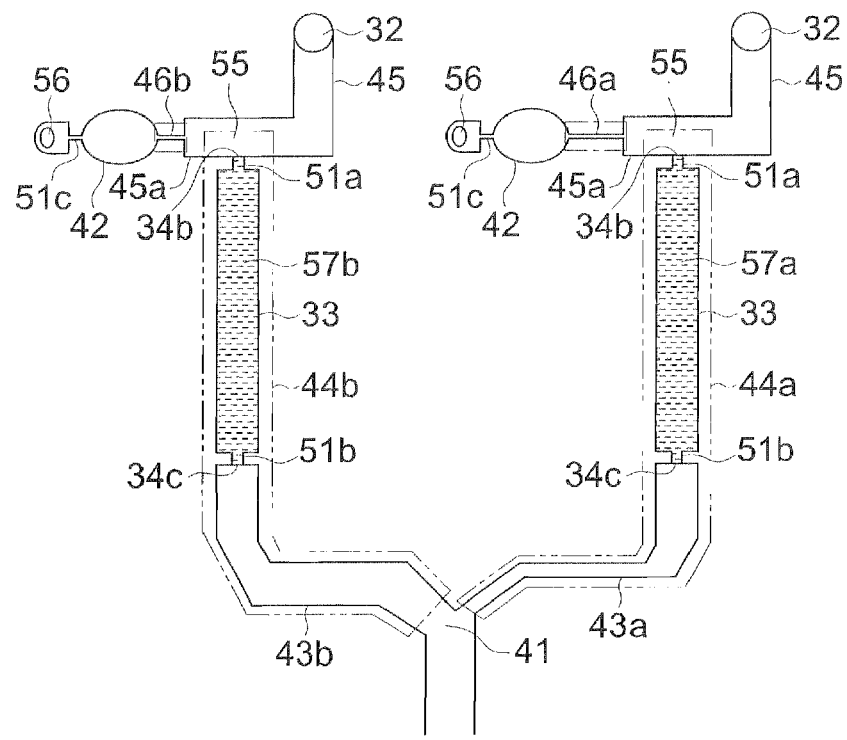
FIG. 10 is a diagram showing the structure of the flow path upstream of the reagent feed-out flow path in the second embodiment of FIG. 8.
Figure 11:
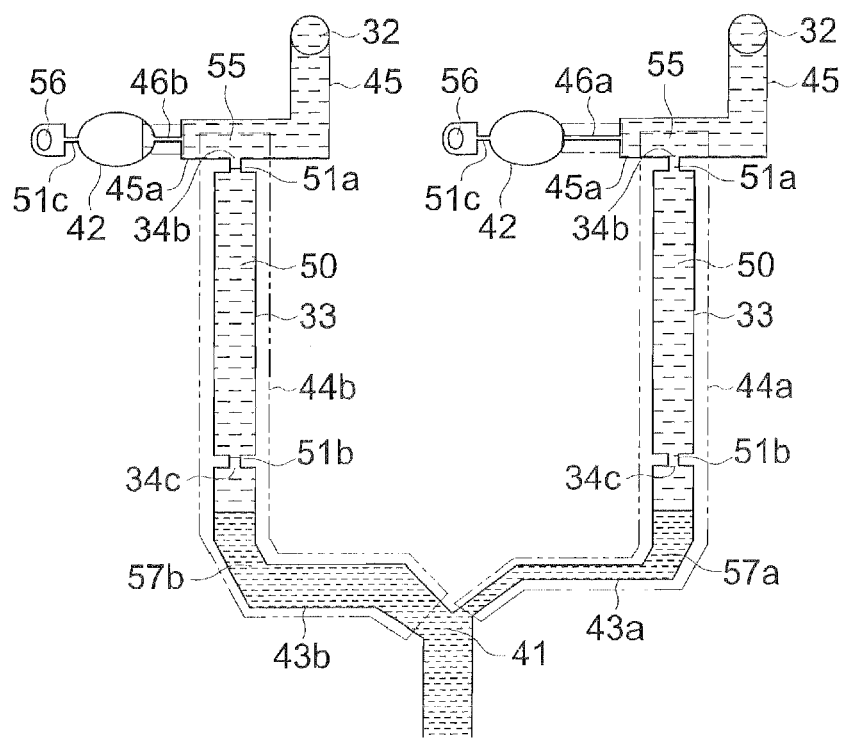
FIG. 11 is a diagram showing how the reagent is fed out downstream by the driving solution in the embodiment of FIG. 10.

FIG. 10 is a diagram showing the structure of the flow path upstream of the reagent feed-out flow path in another embodiment of the present invention. FIG. 11 is a diagram showing how the reagent is fed out downstream by the driving solution. The components corresponding to those of FIGS. 4 through 9 are assigned with the same reference numerals, and detailed description will be omitted to avoid duplication.

The present embodiment is in a form suitable form for the cases where a plurality of reagents are mixed, and the mixed reagent is then reacted with a sample. The flow path system shown in the aforementioned embodiment is provided on the upstream and downstream sides of the reagent storage chambers 33 containing different reagents. To put it another way, a flow path 45 communicating with the opening 32 for supplying the driving solution 50 is provided on the upstream side from the reagent storage chambers 33 containing reagents 57a or 57b. The branch flow path 45a branched off from the storage chamber 34a is provided with air evacuation flow paths 46a or 46b. On the downstream side thereof, reagent feed-out flow paths 43a or 43b is arranged beyond the outlet 34c.

The ends of the reagent feed-out flow paths 43a and 43b are equipped with a junction 41 where the flows of reagents 57a and 57b combine with each other. Reagents 57a and 57b are mixed in the flow path beyond the junction 41. The mixing ratio between the reagents 57a and 57b can be adjusted by the flow path diameter of the reagent feed-out flow paths 43a and 43b. In this example, the reagents 57a and 57b are mixed at a volume ratio of one to two.

As shown in FIG. 1, the driving solution 50 is fed out by a separately installed micro-pump and reagents 57a and 57b are pushed out downstream. In this case, if driving solution 50 leaks from the air evacuation flow paths 46a and 46b as shown in FIG. 11, the voltage of each micro-pump must be controlled so that liquid feed balance is kept at a constant level at all times, for the purpose of achieving high-precision mixing of the reagents 57a and 57b at a predetermined ratio. However, such voltage control is complex.

In the present embodiment, the ratio $R_{a1}/R_{b1}$ of the flow path resistance $R_{a1}$ when the driving solution 50 flows through the air evacuation flow path 46a to the flow path resistance $R_{b1}$ when the driving solution 50 flows through the air evacuation flow path 46b is approximately equal to the ratio $R_{a2}/R_{b2}$ of the flow path resistance $R_{a2}$ when solution flows through the flow channel 44b starting from the branch section 55 and including from the reagent storage section 33 to the reagent feed-out flow path 43a to the flow path resistance $R_{b2}$ when the driving solution 50 flows through the flow channel 44a starting from the branch section 55 and including from the reagent storage section 33 to the reagent feed-out flow path 43a.

This arrangement ensures that the ratio of the volume of the driving solution 50 leaking out from the air evacuation flow path 46a to the volume of the reagent 57a flowing into the junction 41 is approximately equal to the ratio of the volume of the driving solution 50 leaking out though the air evacuation flow path 46b to the volume of the reagent 57b flowing into the junction 41. This arrangement provides easy control of the micro-pump as an external pump. To put it another way, this arrangement permits simplified, e.g., unified voltage control of micro-pumps for pushing out reagents by the feed-out operation of the driving solution. This does not involve complicated control of each of the micro-pumps for the purpose of ensuring constant mixing ratio of the reagents.

Figure 12:
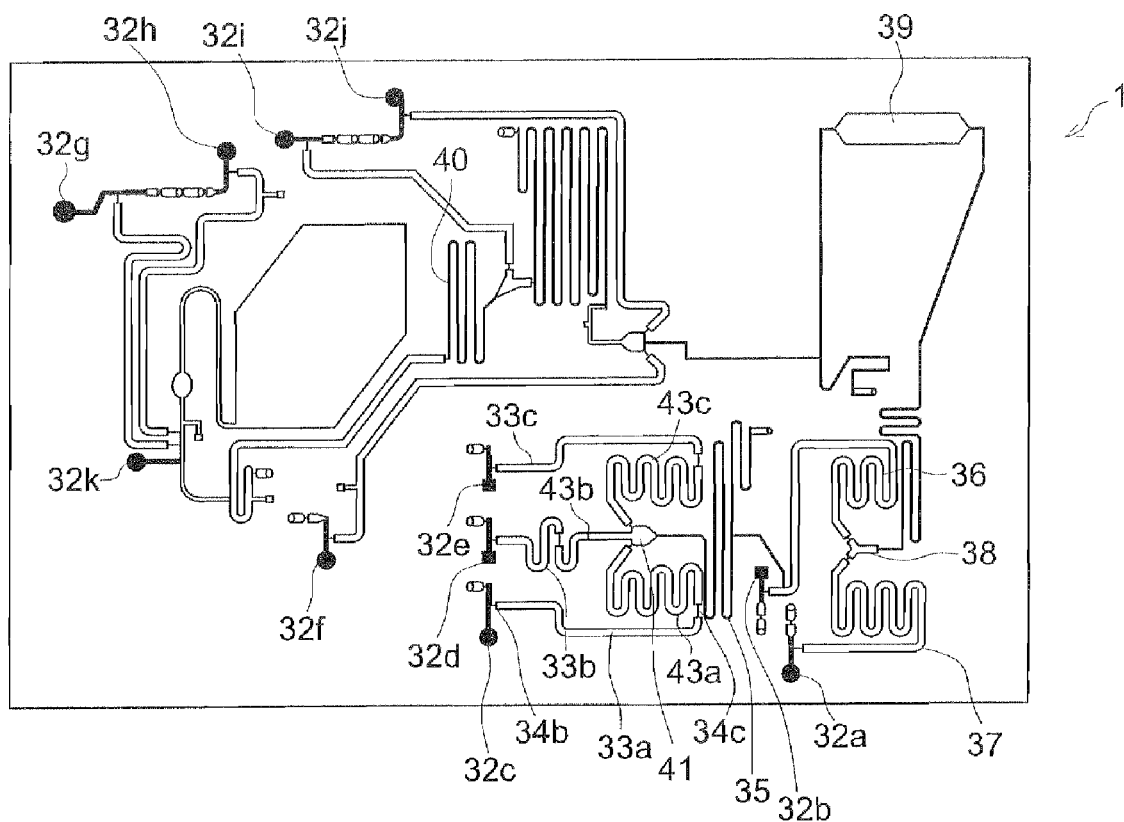
FIG. 12 is a plan view showing the second embodiment of the microreactor of the present invention.

FIG. 12 is a plan view showing another embodiment of the microreactor of the present invention. In the microreactor 1 of this example, three types of reagents are stored in each of the flow path-shaped reagent storage chambers 33a, 33b and 33c. The water-repellent valves of the structure illustrated in FIG. 2 are installed on both ends (the inlet 34b on the upstream side and inlet 34c on the downstream side from the reagent storage section 33a) of each reagent storage section. Reagents are sealed in the flow paths between these water-repellent valves.

In the minute flow path of the microreactor 1 of FIG. 12, the water-repellent valves 1 of FIG. 12 are installed at positions in addition to both ends of the reagent storage chambers 33a, 33b and 33c, although detailed description is omitted. For example, the water repellent valves shown in FIG. 2 are provided at the inlet for the mixed reagent and the inlet for the sample both at the junction 38. These water-repellent valves control the timing of starting the liquid feed to the flow path located beyond the valves.

The openings 32c through 32e that are open outward on one side of the microreactor 1 are provided on the upstream side from the reagent storage chambers 33a, 33b and 33c in FIG. 12. When the microreactor 1 is put on top of the micro-pump (to be described later), these openings 32c through 32e are made to communicate with the micro-pumps to be positioned with respect to the openings of the flow paths provided on the connection surface of the micro-pump unit. The flow paths between the reagent storage chambers 33a through 33c and openings 32c through 32e are designed to have a structure illustrated in FIG. 4, whereby air between the driving liquid and the reagent is removed from the air evacuation flow path.

Similarly, the openings 32a, 32b and 32f through 32k are made to communicate with the micro-pumps by connecting the microreactor 1 to the micro-pump unit. The pump connection section (reference numeral 31 of FIG. 1) is formed by the chip surface including the openings 32a through 32k. The pump connection section is brought in close contact with the connection surface of the micro-pump unit, whereby the microreactor 1 is connected to the micro-pump unit.

To ensure required sealing performance and to prevent the driving solution from leaking out, the contact surface of this pump connection section is preferably formed of a flexible (elastic or shape-following) resin such as polytetrafluoroethylene and silicone resin. Such a flexible contact surface can be made of the constituent material of the microreactor, or a separate flexible member laminated around the flow path opening in the pump connection section.

The reagents stored in the reagent storage chambers 33a, 33b and 33c are fed through the water-repellent valve (not illustrated) installed on the ends on the downstream side from the reagent storage chambers 33a, 33b and 33c, by the separately installed micro-pumps communicating with the openings 32c through 32e. The reagents then flow into the junction 41 from the reagent feed-out flow paths 43a through 43c Thus, three types of reagents are mixed in the reagent mixing flow path 35 which runs beyond the junction 41.

The mixed reagent having been mixed in the reagent mixing flow path 35 and fed out into the mixed reagent feed-out flow path 36 merges with the sample stored in a sample reception section 37 at the junction 38. The mixed reagent is pushed out downstream by the driving solution through the micro-pump communicating with the opening 32b. The sample is pushed out downstream by the driving solution through the micro-pump communicating with the opening 32a. The mixture made of the mixed reagent and sample is stored in a reaction section 39, and reaction is started by heating.

After reaction, the solution is fed into the detection section 40, and a target substance is detected, for example, by the optical detection method. Each reagent stored in advance in the flow path beyond the openings 32f through 32j (e.g., solution for stopping the reaction between the mixed reagent and sample, solution for executing the required processing such as labeling for the target substance, and cleaning solution) is pushed out at predetermined time intervals by the separately installed micro-pumps communicating with those openings.

Figure 13:
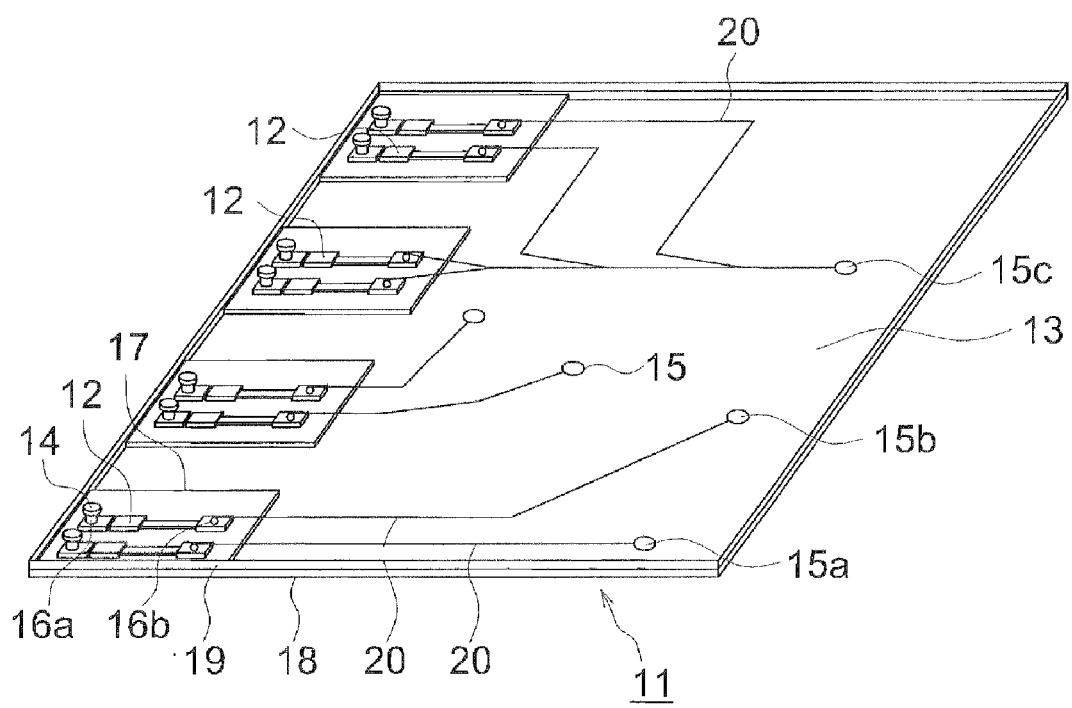
FIG. 13 is a perspective view representing a micro-pump unit used in the microreactor of FIG. 12.
Figure 14:
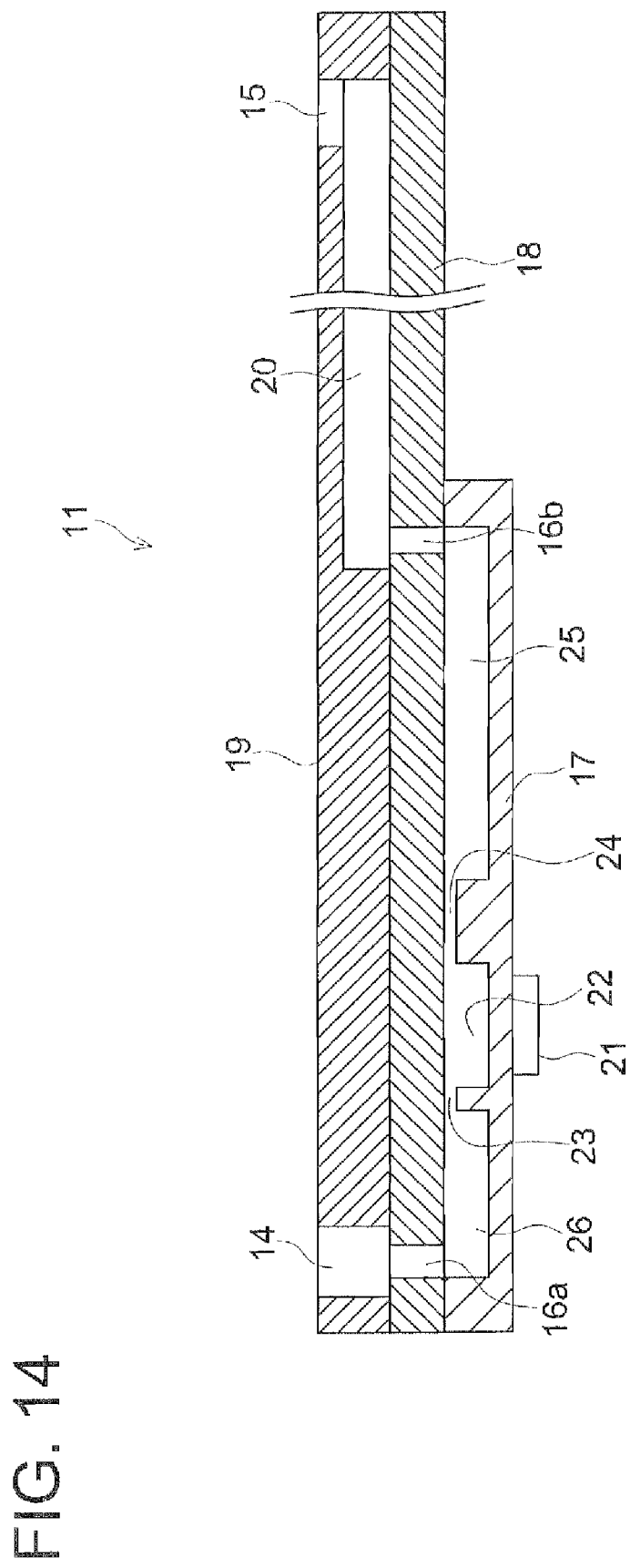
FIG. 14 is a cross sectional view representing the micro-pump unit of FIG. 13.

FIG. 13 is a perspective view representing a micro-pump unit used for the microreactor of FIG. 12. FIG. 14 is a cross sectional view thereof. The micro-pump unit 11 is made up of three substrates: a silicon substrate 17; a glass substrate 18 provided thereon; and a glass substrate 19 thereon. The substrates 17 and 18 are connected to the substrates 18 and 19 by anodic bonding respectively.

The micro-pump 12 (piezo-pump) is comprised of the internal space between the silicon substrate 17 and glass substrate 18 laminated thereon by anodic bonding.

The substrate 17 is the silicon wafer formed into a predetermined shape by photolithographic technique. For example, the pressure chamber 22, first flow path 23, second flow path 24, first liquid chamber 25, and second liquid chamber 26 are formed by microfabrication including forming an oxide film on the silicon substrate surface, coating of a resist, exposure and development of the resist, etching of the oxide film, and etching silicon by the ICP (Inductively Coupled Plasma).

AT the position of the pressure chamber 22, the silicon substrate is processed into a diaphragm. A piezoelectric element 21 made of lead zirconate titanate (PZT) is laminated on the outer surface thereof.

This micro-pump 12 is driven as follows by the control voltage applied to the piezoelectric element 21. The piezoelectric element 21 is oscillated by the applied voltage of a predetermined waveform, and the silicon diaphragm at the position of the pressure chamber 22 is oscillated, whereby the volume of the pressure chamber 22 is increased and decreased. The first flow path 23 and second flow path 24 are the same in width and depth. The length of the second flow path 24 is longer than that of the first flow path 23. When there is an increase in the differential pressure in the first flow path 23, a turbulent flow occurs in the flow path so that the flow path resistance is increased. In the meantime, the second flow path 24 has a longer flow path length, so that the increased differential pressure easily causes a laminar flow. Thus, the percentage of change in the flow path resistance with respect to a change in the differential pressure is smaller than that of the first flow path 23.

For example, when the volume of the pressure chamber 22 is reduced with a large differential pressure applied thereto by a quick displacement of the silicon diaphragm toward the inside of the pressure chamber 22 by adjusting the control voltage applied to the piezoelectric element 21, and then the volume of the pressure chamber is increased with a small differential pressure applied thereto by a slow displacement of the silicon diaphragm outwardly from the pressure chamber 22, the driving solution is fed in the positive direction from left to right in FIG. 14.

Conversely, when the volume of the pressure chamber 22 is increased with a large differential pressure applied thereto by a quick displacement of the silicon diaphragm outwardly from the pressure chamber, and then the volume of the pressure chamber 22 is decreased with a small differential pressure applied thereto by a slow displacement of the silicon diaphragm toward the inside of the pressure chamber 22, the driving solution is fed in the negative direction from right to left in FIG. 14.

The difference between the percentages of changes in flow path resistances relative to the change in differential pressure in the first flow path 23 and second flow path 24 is not necessarily caused by the difference in the length of the flow path. It may be caused by other geometric differences.

The flow rate by the micro-pump 12 can be controlled by adjusting the voltage applied to the piezoelectric element 21.

A flow path 20 is patterned on the substrate 19. For example, the flow path 20 is formed in a rectangular structure having a rectangular cross-sectional shape with a width of about 150 μm and a depth of about 300 μm. On the downstream side of the flow path 20, there is an opening 15 to be communicated between the micro-pump 12 and the minute flow path by being aligned with the openings 32a through 32k of the microreactor of FIG. 12.

The upstream side of the flow path 20 leads to the micro-pump 12 through the flow path provided on the substrate 17 via the through-hole 16b in the substrate 18. The upstream side of the micro-pump 12 is connected to the opening 14 provided in the glass-made substrate 19 through the flow path of the substrate 17 and the through-hole 16a in the substrate 18. This opening 14 is connected with the driving solution tank (not illustrated). The opening 14 is connected to the driving solution tank, for example, through the gasket made of PDMS (polydimethyl siloxane).

The openings 15a, 15b and 15c communicate with the openings 32c, 32d and 32e of the microreactor in FIG. 12 (where only a part of the entire micro-pump unit is shown in FIG. 13). The driving solution is fed through the flow path 20, opening 15a and opening 32c by the micro-pump 12 so that the reagent stored in the reagent storage section 33a is pushed out downstream. The driving solution is fed through the flow path 20, opening 15b and opening 32d so that the reagent stored in the reagent storage section 33b is pushed out downstream. The driving solution is fed through the flow path 20, opening 15c and opening 32e, and the reagent stored in the reagent storage section 33c is pushed out downstream.

As described above, all the micro-pumps for feeding the reagents and other liquids are arranged on a single chip. Then this chip and microreactor are put one on top of another at the time of analysis to provide communication between them. The micro-pump unit designed in this structure can be used to produce a compact pump mechanism that pushes the reagent in the microreactor out downstream of the minute flow path.

Further, a single driving solution tank can be shared by a plurality of micro-pumps, and connection between the driving solution tank and chip-formed micro-pump unit does not require a special piping or a routing chip. This advantage permits construction of a compact pump mechanism that pushes the reagent in the microreactor out downstream of the minute flow path.

Figure 15:
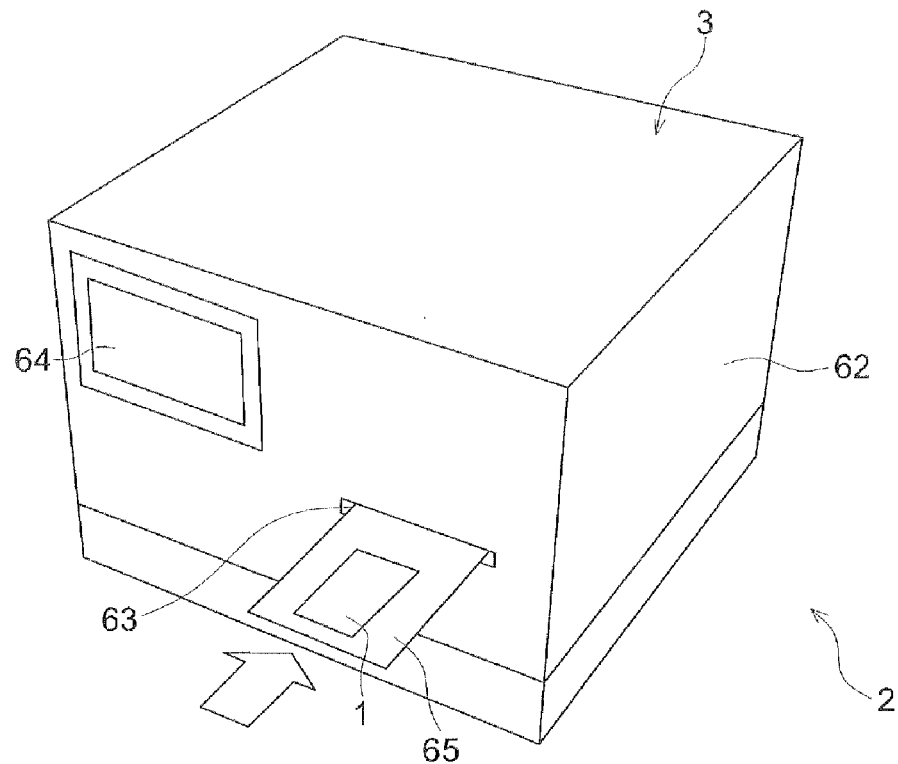
FIG. 15 is a perspective view showing an example of an integrated micro analysis system.
Figure 16:
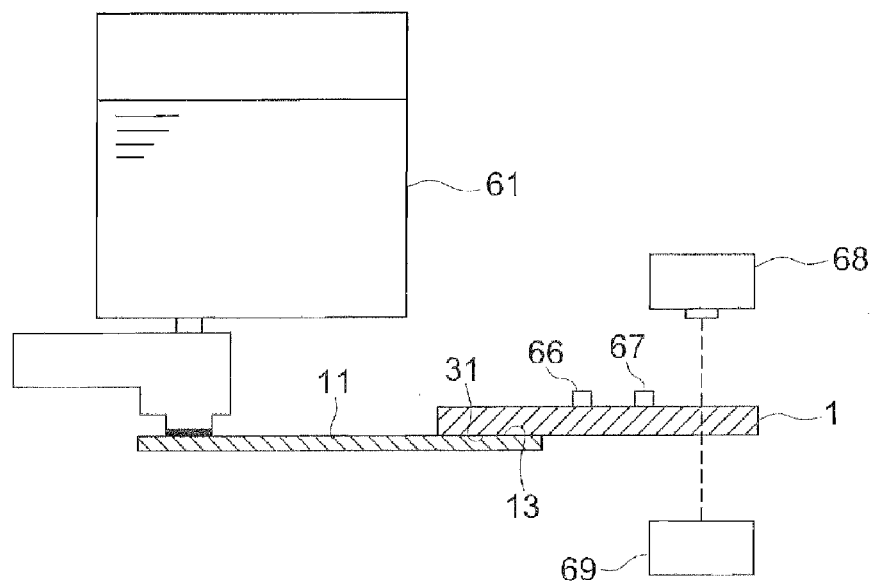
FIG. 16 is an internal structure of the system body in the integrated micro analysis system of FIG. 15.

When mounted on a separate system body, the microreactor starts reaction and analysis. These system body and microreactor constitute an integrated micro analysis system. An example of this integrated micro analysis system will be described below. FIG. 15 is a perspective view showing an example of an integrated micro analysis system. FIG. 16 is an internal structure of the system body in the integrated micro analysis system.

The system body 3 of the integrated micro analysis system contains apparatuses for analysis which are installed in an enclosure-shaped storage member 62. The storage member 62 incorporates the micro-pump unit 11, which further incorporates a chip connection section 13 provided with a flow path opening communicating with the microreactor 1, and a plurality of micro-pumps (not illustrated).

Further, the storage member 62 includes a detection processing apparatus (a light source 68 for detecting reaction in the microreactor 1 such as an LED, photomultiplier and CCD camera, and a detector 69 for optical detection by visible spectroscopy, fluorometry or the like), and a control apparatus for controlling this detection processing apparatus and the micro-pump unit 11. This control apparatus provides control of the liquid feed by the micro-pump, control of the detection processing apparatus for detecting reaction in the microreactor 1 by optical means, control of the microreactor 1 temperature by the heating/cooling unit (to be described later), control of the reaction in the microreactor 1, data collection (measurement) and processing. The micro-pump is controlled by applying a drive voltage to the micro-pump according to the program containing the settings of the liquid feed sequence, flow rate, timing and other conditions.

In the integrated micro analysis system 2, the target substance in the specimen is analyzed in the microreactor 1 after mounting the microreactor 1 inside the storage member 62 in the situation that the pump connection section 31 made up of the openings of the flow paths provided on the upstream side (e.g., on the upstream side from the reagent storage section or sample reception section) of the minute flow paths of the microreactor 1 and the chip surfaces in the periphery of the openings, and the chip connection section 13 of the micro-pump unit 11 are brought into contact with each other under fluid-tight conditions. The microreactor 1 is placed on a conveyance tray 65 to be led into the storage member 62 from the insertion port 63. However, use of a conveyance tray is not necessarily required if the microreactor can be fixed inside the storage member 62 while the microreactor is pressed against the micro-pump unit.

The storage member 62 incorporates a heating/cooling unit (Peltier element 66 and heater 67) for locally heating and cooling the microreactor 1 mounted at a predetermined position. For example, selective cooling of the reagent storage section is achieved by the Peltier element 66 pressed against the region of the reagent storage section of the microreactor 1, whereby degeneration of the reagent is prevented. At the same time, the heater 67 is pressed against the region of the flow path constituting the reaction section, whereby the reaction section is selectively heated and the temperature of the reaction section is adjusted to the level appropriate for reaction.

The micro-pump unit 11 is connected to the driving solution tank 61, and the upstream side of the micro-pump communicates with this driving solution tank 61. In the meantime, the downstream side of the micro-pump communicates with the opening of the flow path arranged on one surface of the micro-pump unit 11. The microreactor 1 is connected to the micro-pump unit 11 in such a way that each of the openings of the flow path connected to each of the micro-pumps communicates with each of the openings of the flow path arranged on the pump connection section 31 of the microreactor 1.

The aqueous driving solution stored in the driving solution tank 61 is fed into the storage section for each liquid in the microreactor 1 through the pump connection section 31 by the micro-pump, and the liquid of each storage section is pushed out downstream of the microreactor 1 by the driving solution.

A series of operations including pre-processing, reaction and detection of the specimen as a test sample is carried out when the microreactor 1 is being mounted on the system body 2 composed of the integration of the micro-pump, detection processing apparatus and control apparatus. Preferably, a predetermined reaction and optical measurement in response to feeding, pre-processing and mixing of the sample and reagent are automatically performed as a series of continuous steps, and the test data together with the required conditions and record items is stored in a file. In FIG. 15, the analysis result is indicated on the display 64 of the storage member 62.

The following describes the reaction between the sample (specimen) and reagent using the microreactor of the present invention, as well as the specific example of detection thereof: In a preferred example of the microreactor, a single chip includes:

a sample reception section containing a specimen or analyte (e.g., DNA, RNA and gene) extracted from the specimen;

a specimen pre-processing section for pre-processing the specimen;

a reagent storage section for storing the reagents used in probe coupling reaction and detection reaction (including the gene amplification reaction or antigen-antibody reaction);

a positive control storage section for incorporating positive control;

a negative control storage section for incorporating negative control;

a probe storage section for storing probes (e.g., a probe to be hybridized to the gene to be detected, the gene having been amplified by the gene amplification reaction);

a minute flow path communicating with these storage sections; and a pump connection section that can be connected to a separate micro-pump that feeds liquids of the aforementioned storage sections and flow path.

The aforementioned micro-pump unit is connected to this micro-reactor through the pump connection section. The specimen or biological substance (e.g., DNA and other biological substance) extracted from the specimen placed in the sample reception section, and the reagent contained in the reagent storage section are fed into the downstream flow path. They are mixed and are made to react in the reaction section of the minute flow path, for example, in the reaction section for gene amplification reaction (antigen-antibody reaction in the case of protein). Then the processed solution obtained by processing this reaction solution and the probe contained in the probe storage section are fed into the detection section along the downstream flow path. They are then mixed in the flow path and are made to couple (hybridize) with the probe. Thus, detection of a biological substance is carried out based on this reaction product.

Similarly, the positive control contained in the positive control storage section and negative control contained in the negative control storage section are also subjected to the aforementioned reaction and detection.

The specimen injected into the sample reception section is pre-processed in advance, for example, by mixing the specimen and processing solution in the specimen pre-processing section provided in the flow path, prior to mixture with the reagent, as required. This specimen pre-processing section may include a separation filter, adsorption resin or beads. Preferred specimen pre-processing is exemplified by separation or concentration of the analyte, and deproteinization.

For example, processing of bacteriolysis/DNA extraction is carried out using a bacteriolytic agent such as a 1% SDS mixture. In this step, DNA is released out of the cell, and is adsorbed onto the beads or filter film surface.

A predetermined volume of required reagent is sealed in the reagent storage section of the microreactor in advance. This eliminates the need of filling with a predetermined volume of the reagent every time it is used. The reagent is ready for use at any time. When the biological substance in the specimen is to be analyzed, the reagents required for measurement are commonly known. For example, when the antigen-antibody reaction in the specimen is to be analyzed, the reagent containing the antibody corresponding thereto, preferably the reagent containing a monoclonal antibody is used. The antibody is preferably labeled by a biotin or FITC.

The examples of the reagents stored in advance in the microreactor for genetic screening include probes used for detection, color development reagents and pre-processing reagents for the aforementioned specimen pre-processing in addition to various types of reagents used for gene amplification.

When the driving solution is supplied from the micro-pump, the reagents are pushed out of each reagent storage section, and that the merged reagents make a mixed reagent.

After that, the driving solution is supplied from the micropump, whereby the specimen is pushed out of the sample reception section. They are merged with the mixed reagent with stabilized mixing ratio, whereby the reaction section starts reaction required for analysis such as gene amplification reaction, analyte trapping or antigen-antibody reaction.

The flow path between the inlet of the sample reception section in the microreactor and the opening of the pump connection section is provided with the aforementioned air evacuation flow path. To be more specific, the flow path of the microreactor is made of a hydrophobic resin, and reagent is pushed out by the aqueous driving solution such as pure water or buffer solution. By forming the air evacuation flow path whose outwardly opening end has a diameter of several μm, the air bubbles between these solutions are removed, in the initial phase of feeding out the driving solution into the inlet after the micro-pump unit is connected to the microreactor.

The PCR amplification method can be used as a DNA amplification method. This PCR amplification method, together with improvements, is described in various documents, and is actively employed over an extensive range. The PCR amplification method requires control of temperature wherein the control is made among three different temperatures. A flow path device capable of temperature control appropriate for micro-chips has already been proposed by the present inventors (Unexamined Japanese Patent Application Publication No 2004-108285). This device system can be used in the amplification flow path of the chip of the present invention. This allows the heat cycle to be switched at a high speed. Because the minute flow path is made to be a micro-reaction cell having a small heat capacity, the DNA amplification method requires much shorter time than the conventional manual operation method.

The ICAN (Isothermal Chimera Primer Initiated Nucleic Acid Amplification) method developed in recent years carries out the DNA amplification in a short period of time at any temperature between 50 through 65° C. (Japanese Registration Patent No. 3433929), and is an amplification technology suitable for use in the system of the present invention. The work requiring one hour in the manual operation method, can be completed in the system of the present invention in 10 through 20 minutes, preferably in 15 minutes, wherein analysis is also included in the work completed in such a short time.

The downstream portion from the reaction section in the minute flow path of the microreactor is provided with a detection section for screening an analyte, for example, an amplified gene. At least the detection portion is made of a transparent material, preferably a transparent plastic for the purpose of performing optical measurement.

The protein having an affinity for biotin (avidin or streptoavidin) adsorbed on the detection section on the minute flow path is connected specifically with the biotin labeled on a probe substance or the biotin labeled on the 5'-terminus of the primer used in gene amplification reaction. Thus, the probe labeled with the biotin or the amplified gene is trapped by this detection portion.

There is no particular restriction to the method of detecting the DNA of the isolated analyte or the target gene having been amplified. The following steps are basically used in the preferred method:

(1a) The specimen or the DNA extracted from the specimen, or cDNA obtained by reverse transcription reaction from the specimen or the RNA extracted from the specimen, and a primer biotin-modified at the 5' position are fed from the storage section into the downstream minute flow path.

The amplification reaction solution including the gene amplified in the minute flow path subsequent to gene amplification reaction in the minute flow path of the reaction section is mixed with denaturation solution, and the amplified gene is formed into a single strand. This is hybridized with the probe DNA whose terminus is fluorescent-labeled by the FITC (fluorescein isothiocyanate).

This solution is fed into the detection portion in the minute flow path on which the protein having an affinity for biotin is adsorbed, whereby the amplified gene is trapped by the detection portion inside the minute flow path (can be hybridized with the probe DNA fluorescent-labeled after the amplified gene has been trapped by the detection portion.

(1b) A specimen is mixed with the reagent containing the antibody specific to the antigen, metabolic substances, hormone and other analytes present in the specimen, preferably the monoclonal antibody. In this case, the antibody is labeled with biotin and FITC. Thus, the product obtained by antigen-antibody reaction contains biotin and FITC. This is fed into the detection portion in the minute flow path on which protein having an affinity for biotin (preferably streptoavidin) is adsorbed, and is fixed at the detection portion through the coupling between the biotin-philic protein and biotin.

(2) A gold colloidal liquid whose surface is modified with the anti-FITC antibody specifically coupled with the FITC is fed into the minute flow path, and the gold colloid is adsorbed on the FITC of the analyte/antibody reactant fixed thereby, or to the FITC-modified probe hybridized with the gene.

(3) The concentration of the gold colloid in the minute flow path is optically measured.

The embodiments of the present invention have been discussed above. It is to be expressly understood, however, that the present invention is not restricted thereto, and changes and variations may be made without departing from the spirit of the appended claims.

The invention claimed is:

1. A microreactor having a plate like substrate, the microreactor comprising in the plate like substrate:
   a reagent storage section; the reagent storage section including:
      a storage chamber for storing a reagent therein;
      an inlet which is provided to the storage chamber and through which a driving solution is injected into the storage chamber; and
      an outlet through which the reagent is pushed out of the storage chamber by the driving solution having been injected,
   a reagent feed-out flow path which communicates with the reagent storage section through the outlet and through which the pushed out reagent is fed out of the reagent storage section;
   a first flow path which is provided upstream from the reagent storage section and has a first end and a second end, the first end being connected to the inlet of the reagent storage section so that the first flow path communicates with the storage chamber, and the second end being provided with a first opening which is to be connected to an external pump for feeding the driving solution when the external pump is connected to the substrate;
   a branch flow path which is branched off from a branch section connected directly to the first end of the first flow path where the first flow path is connected to the inlet; and
   an air evacuation flow path which is adjacent to the branch flow path so as to extend directly from the branch flow path, and whose distal end has a second opening open to an outside, the air evacuation flow path being configured so that a fluidic resistance of the air evacuation flow path for a liquid is greater than a fluidic resistance, for the liquid, of a flow channel which starts from the branch section as a starting point and includes from the branch section to the reagent feed-out flow path, wherein when the driving solution is fed from the first opening, air in the first flow path and the air evacuation flow path is released from the second opening.

2. The microreactor of claim 1, wherein the air evacuation flow path is configured so that the fluidic resistance of the air evacuation flow path for the liquid is 10 times or higher than the fluidic resistance of the flow channel for the liquid.

3. The microreactor of claim 1, wherein the air evacuation flow path is configured so that the fluidic resistance of the air evacuation flow path for an air is smaller than the fluidic resistance of the flow channel for the liquid.

4. The microreactor of claim 1, comprising:
a water-repellent valve which is provided at an upstream side of the outlet of the reagent storage section, the water-repellent valve including:
a liquid-feed controlling flow passage which connects the reagent storage section to the reagent feed-out flow path, and have a cross-sectional area smaller than a cross-sectional area of the reagent storage section and the reagent feed-out flow path,
wherein the water-repellent valve prevents a reagent from passing through unless a liquid feed pressure in the reagent storage section reaches a predetermined pressure P and allows the reagent to pass through when the liquid feed pressure in the reagent storage section is equal to or higher than the predetermined pressure P, and a flow rate Q of a liquid flowing into the branch section from the first opening satisfies the following relationship:

$$P/R_L \leq Q \leq P/R_A$$

wherein:
$R_A$ is a fluidic resistance where an air passes through the air evacuation flow path; and
$R_L$ is a fluidic resistance where a liquid passes through the air evacuation flow path.

5. The microreactor of claim 1, comprising:
a plurality of the reagent storage sections;
a plurality of the reagent feed-out flow paths;
a plurality of the first flow paths;
a plurality of the branch flow paths; and
a junction at which the plurality of the reagent feed-out flow paths meet,
wherein a ratio between fluid resistances, for a liquid, of two air evacuation flow paths arbitrarily selected from the plurality the air evacuation flow paths is substantially the same as a ratio between fluidic resistances, for the liquid, of two flow channels each corresponding to each of the selected air evacuation flow paths.

6. The microreactor of claim 1, wherein the air evacuation flow path includes:
a reservoir section which is provided upstream from the second opening of the air evacuation flow path and is in communication with the second opening so as to reserve the driving solution fed through the air evacuation flow path.

7. The microreactor of claim 6, wherein the air evacuation flow path includes:
a water-repellent valve which is provided between the second opening and the reservoir section, the water-repellent valve including:
a liquid-feed controlling flow passage which connects the reservoir section to the second opening, and have a cross-sectional area smaller than a cross-sectional area of the reservoir section,
wherein the second water-repellent valve prevents the driving solution from passing through to a side of the second opening unless a liquid pressure in the forth flow path exceeds a predetermined pressure.

* * * * *